US011002848B2

(12) United States Patent
Liao et al.

(10) Patent No.: US 11,002,848 B2
(45) Date of Patent: May 11, 2021

(54) INTERFEROMETRIC SYNTHETIC APERTURE RADAR IMAGING OF SUBSURFACE STRUCTURES

(71) Applicant: Department of the Army, U.S. Army CCDC Army Research Laboratory, Adelphi, MD (US)

(72) Inventors: DaHan Liao, Laurel, MD (US); Calvin D. Le, Rockville, MD (US); Traian V. Dogaru, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 160 days.

(21) Appl. No.: 16/412,471

(22) Filed: May 15, 2019

(65) Prior Publication Data

US 2020/0363525 A1 Nov. 19, 2020

(51) Int. Cl.
*G01S 13/90* (2006.01)

(52) U.S. Cl.
CPC ...... *G01S 13/9023* (2013.01); *G01S 13/9004* (2019.05); *G01S 13/9076* (2019.05)

(58) Field of Classification Search
CPC ........ G01S 13/88; G01S 13/885; G01S 13/90; G01S 13/9004; G01S 13/9021; G01S 13/9023; G01S 13/9041–9054; G01S 13/9076; G01S 13/9092
See application file for complete search history.

(56) References Cited

U.S. PATENT DOCUMENTS

| | | | | | |
|---|---|---|---|---|---|
| 3,918,055 | A | * | 11/1975 | Shimizu | G01S 7/025 342/159 |
| 4,766,435 | A | * | 8/1988 | Wells | G01S 7/026 342/159 |
| 5,160,931 | A | * | 11/1992 | Brown | G01S 13/9011 342/25 C |
| 5,502,444 | A | * | 3/1996 | Kohlberg | G01S 7/292 342/22 |
| 5,952,954 | A | * | 9/1999 | Beckner | G01S 7/2813 342/159 |
| 9,086,501 | B2 | * | 7/2015 | Beer | G01S 7/295 |
| 9,519,055 | B2 | * | 12/2016 | Hellsten | G01S 13/02 |
| 9,523,768 | B1 | * | 12/2016 | Rincon | G01S 13/9023 |
| 9,638,826 | B2 | * | 5/2017 | Sokolowsky | G01V 3/083 |

(Continued)

OTHER PUBLICATIONS

Hellsten, H., et al., "Polarimetric subsurface SAR imaging: outcome of theoretical development and Carabas III tests," 2014 International Radar Conference, Lille, 2014, pp. 1-8.

(Continued)

*Primary Examiner* — Peter M Bythrow
(74) *Attorney, Agent, or Firm* — Alan I. Kalb

(57) ABSTRACT

A subsurface interferometric synthetic aperture radar (In-SAR) imaging technique for the detection and localization of underground targets in the presence of a rough ground surface comprises a two-step procedure. First, surface clutter suppression is performed with a polarimetric difference operation that does not alter the propagation phase of the target scattered signal; then a subsurface interferometric algorithm is applied to infer target depth by correlating the clutter-suppressed images obtained along two observation paths.

13 Claims, 19 Drawing Sheets
(7 of 19 Drawing Sheet(s) Filed in Color)

(56) References Cited

U.S. PATENT DOCUMENTS

| | | | |
|---|---|---|---|
| 9,671,521 B2* | 6/2017 | Louchard | G01V 1/28 |
| 10,620,051 B2* | 4/2020 | Acker | G01V 3/12 |
| 2004/0118313 A1* | 6/2004 | Temes | F41H 11/12 102/498 |
| 2005/0128125 A1* | 6/2005 | Li | G01V 3/12 342/22 |
| 2007/0024489 A1* | 2/2007 | Cerwin | G01S 13/9027 342/22 |
| 2010/0052970 A1* | 3/2010 | Moussally | G01S 13/282 342/22 |
| 2015/0123835 A1* | 5/2015 | Sokolowsky | G01V 3/38 342/22 |
| 2015/0323666 A1* | 11/2015 | Murata | G01S 13/9023 342/25 C |
| 2016/0238704 A1* | 8/2016 | Schultz | E21B 49/00 |
| 2018/0336308 A1* | 11/2018 | Dokken | G01S 13/937 |
| 2019/0025423 A1* | 1/2019 | Sajwaj | G01S 13/867 |

OTHER PUBLICATIONS

Liao, D., et al., "Large-scale, full-wave-based emulation of step-frequency forward-looking radar imaging in rough terrain environments," Sensing and Imaging, vol. 15, pp. 1-29, Apr. 2014.

Liao, D., et al., "Full-wave scattering and imaging characterization of realistic trees for FOPEN sensing," IEEE Geoscience and Remote Sensing Letters, vol. 13, No. 7, pp. 957-961, Jul. 2016.

Liao, D., et al., "Near-earth wave propagation characteristics of electric dipole in presence of vegetation or snow layer," IEEE Transactions on Antennas and Propagation, vol. 53, No. 11, pp. 3747-3756, Nov. 2005.

Liao, D., et al., "Full-wave characterization of rough terrain surface scattering for forward-looking radar applications," IEEE Transactions on Antennas and Propagation, vol. 60, No. 8, pp. 3853-3866, Aug. 2012.

Liao, D., et al., "A comparison of surface integral equation and FDTD methods for modeling backscattering from dielectric rough surfaces at near-grazing angles," 2011 IEEE International Symposium on Antennas and Propagation, Spokane, WA, 2011, pp. 232-235.

Dogaru, T. et al., "SAR images of rooms and buildings based on FDTD computer models," IEEE Transactions on Geoscience and Remote Sensing, vol. 47, No. 5, pp. 1388-1401, May 2009.

Dogaru, T. et al., "Recent investigations in sensing through the wall radar modeling," 2008 IEEE Antennas and Propagation Society International Symposium, San Diego, CA, 2008, pp. 1-4.

Liu, Y., et al., "FDTD investigation on GPR detecting of underground subsurface layers and buried objects," 2016 IEEE MTT-S International Conference on Numerical Electromagnetic and Multiphysics Modeling and Optimization (NEMO), Beijing, 2016, pp. 1-2.

Tenuti, L., et al., "Physical-information exploitation in inverse scattering approaches for GPR survey," 2015 9th European Conference on Antennas and Propagation (EuCAP), Lisbon, 2015, pp. 1-4.

Negishi, T., et al., "Buried objects and void detection using RF Tomography," 2014 United States National Committee of URSI National Radio Science Meeting (USNC-URSI NRSM), Boulder, CO, 2014, pp. 1-1.

Morgenthaler, A., et al., "Fast GPR underground shape anomaly detection using the Semi-Analytic Mode Matching (SAMM) algorithm," 2013 IEEE International Geoscience and Remote Sensing Symposium, Melbourne, VIC, 2013, pp. 1422-1425.

Estatico, C., et al., "Buried object detection by means of a Lp Banach-space inversion procedure," 2013 International Symposium on Electromagnetic Theory, Hiroshima, 2013, pp. 131-134.

Soldovier, F., et al., "Tunnel detection and localisation via multi-monostatic radio frequency tomography using magnetic sources," IET Radar, Sonar & Navigation, vol. 6, No. 9, pp. 834-845, Dec. 2012.

Zhuang, L., et al., "Range profile analysis of the buried 3-D dielectric object based on the EM numerical simulation," EUSAR 2012; 9th European Conference on Synthetic Aperture Radar, Nuremberg, Germany, 2012, pp. 442-445.

Martinez-Lorenzo, J., et al., "Physical limitations on detecting tunnels using underground-focusing spotlight synthetic aperture radar," IEEE Transactions on Geoscience and Remote Sensing, vol. 49, No. 1, pp. 65-70, Jan. 2011.

Xiao-Zhou, L., et al., "The application of ground penetrating radar in advanced prediction of tunnel," 2011 Second International Conference on Mechanic Automation and Control Engineering, Hohhot, 2011, pp. 2676-2679.

Norgard, J., et al., "Computational electromagnetic modeling and simulation of ultra wideband sub-surface sensors or the detection and imaging of buried objects using spatial and spectral diversity," 2010 Asia-Pacific International Symposium on Electromagnetic Compatibility, Beijing, 2010, pp. 544-547.

Monte, L., et al., "Radio frequency tomography for tunnel detection," IEEE Transactions on Geoscience and Remote Sensing, vol. 48, No. 3, pp. 1128-1137, Mar. 2010.

Kuloglu, M., et al., "Ground penetrating radar for tunnel detection," 2010 IEEE International Geoscience and Remote Sensing Symposium, Honolulu, HI, 2010, pp. 4314-4317.

Monte, L., et al., "Distributed RF tomography for tunnel detection: Suitable inversion schemes," Proceedings of the IEEE 2009 National Aerospace & Electronics Conference (NAECON), Dayton, OH, 2009, pp. 182-189.

Cui, T., et al., "Inverse-scattering methods for three-dimensional targets buried in the lossy earth," 2000 IEEE Antennas and Propagation Society International Symposium, Salt Lake City, UT, 2000, pp. 1776-1779.

Goodman, N., et al., "Subsurface imaging using ground-penetrating radar measurements," 1996 Geoscience and Remote Sensing Symposium, Lincoln, NE, 1996, pp. 2036-2037.

Liu, C., et al., "Numerical simulation of subsurface radar for detecting buried pipes," IEEE Transactions on Geoscience and Remote Sensing, vol. 29, No. 5, pp. 795-798, Sep. 1991.

Bao, Q., et al., "Holographic SAR tomography image reconstruction by combination of adaptive imaging and sparse Bayesian inference," IEEE Geoscience and Remote Sensing Letters, vol. 14, No. 8, pp. 1248-1252, Aug. 2017.

* cited by examiner

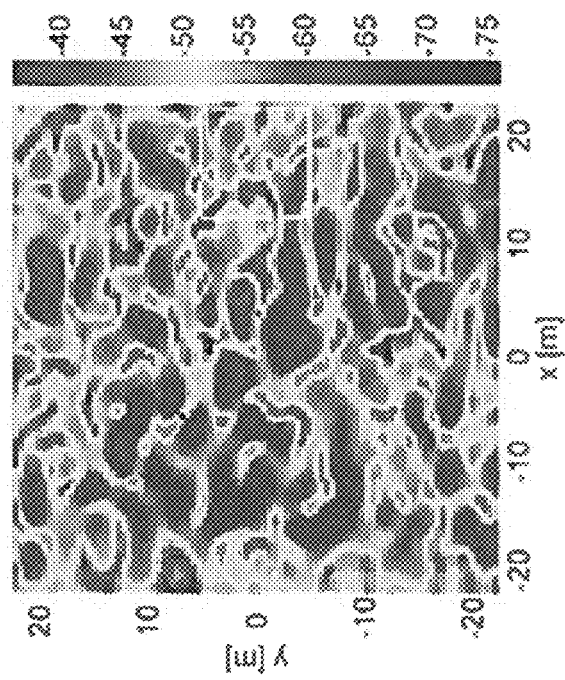
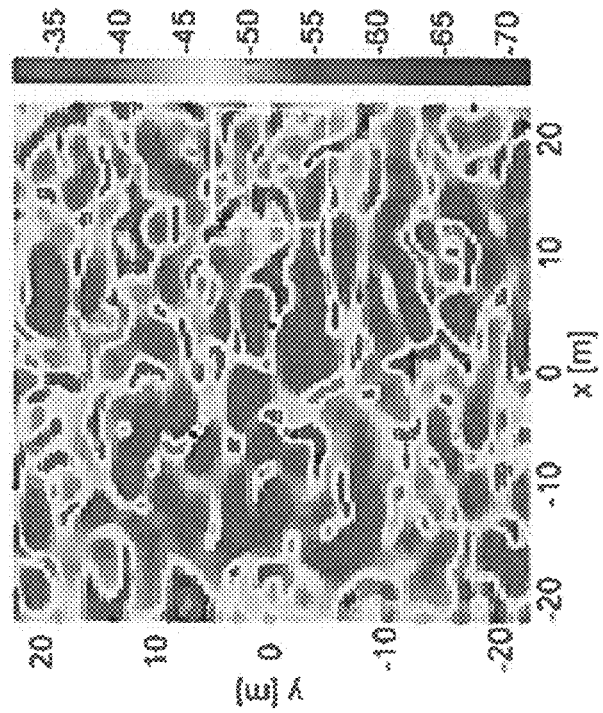
FIG. 4C
FIG. 4D

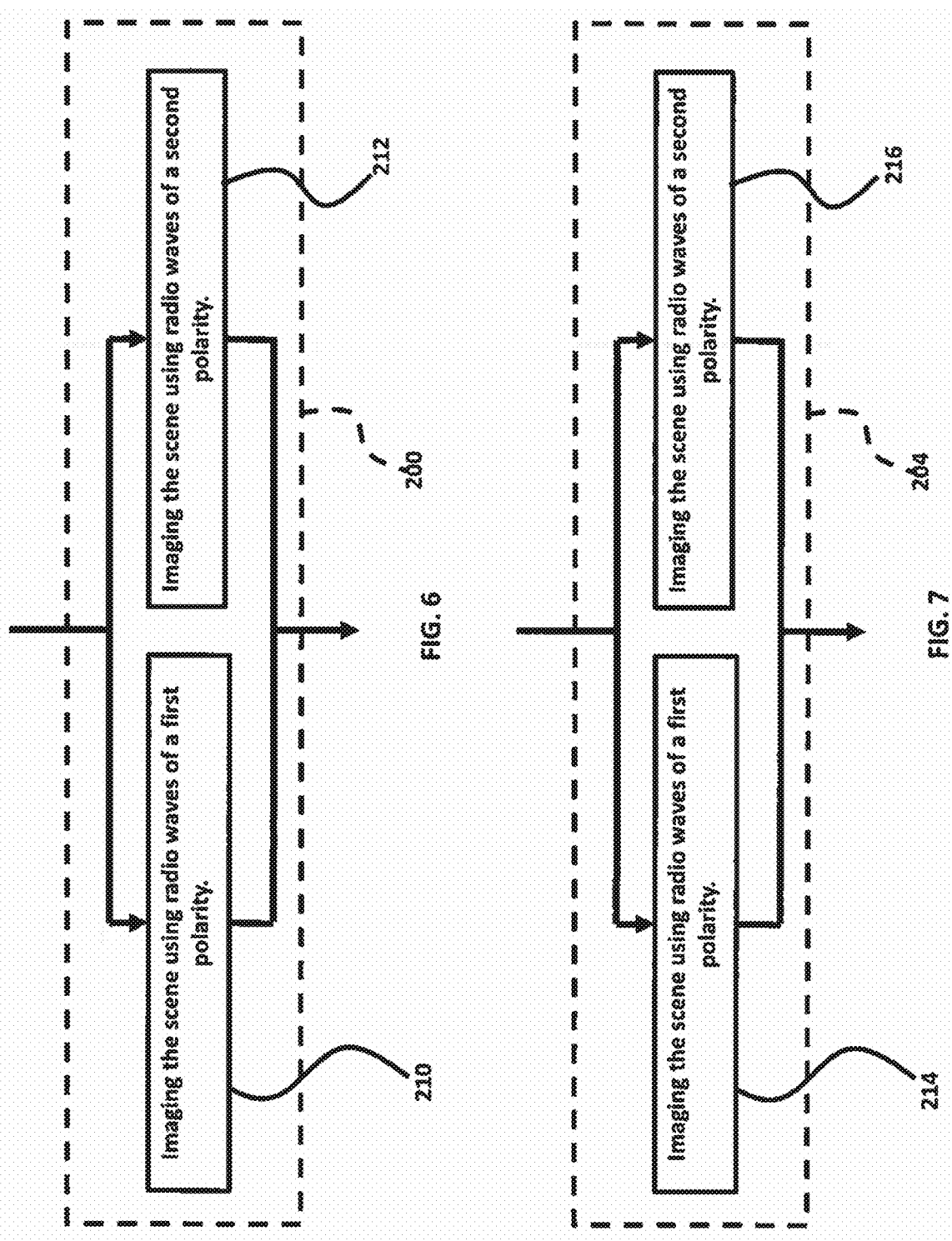

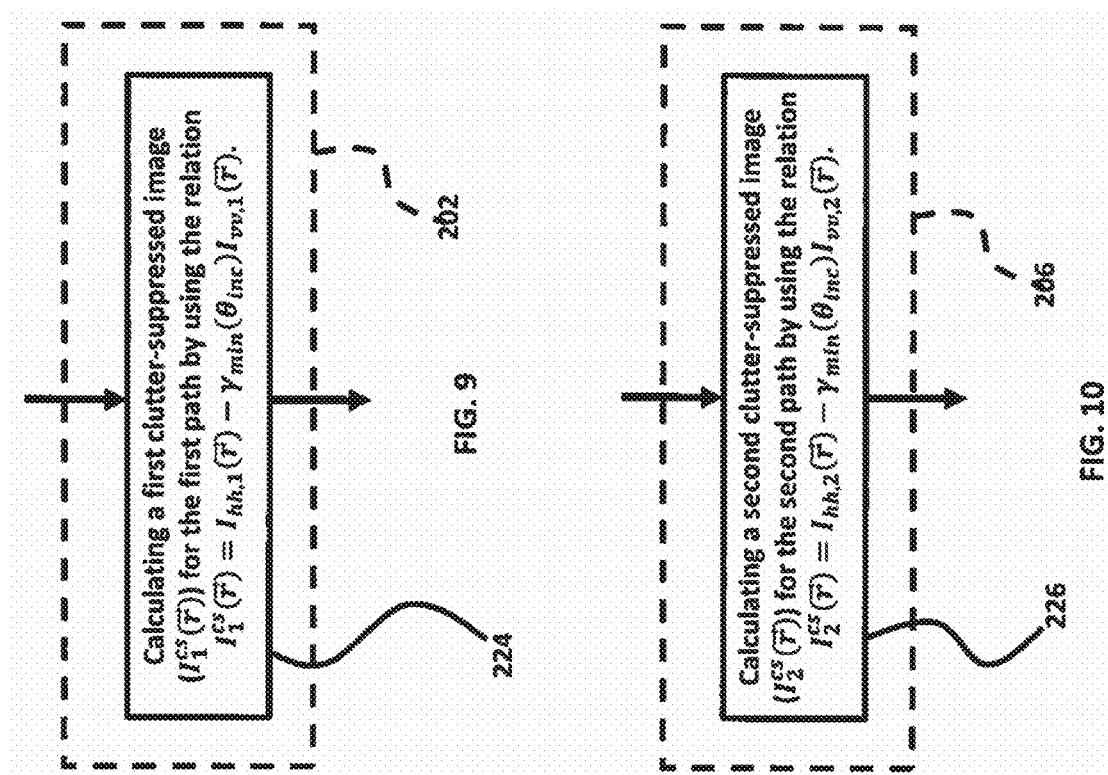

INTERFEROMETRIC SYNTHETIC APERTURE RADAR IMAGING OF SUBSURFACE STRUCTURES

GOVERNMENT INTEREST

The embodiments herein may be manufactured, used, and/or licensed by or for the United States Government without the payment of royalties thereon.

BACKGROUND

Technical Field

The embodiments herein generally relate to a method for interferometric synthetic aperture radar imaging of subsurface structures that provides depth information regarding the subsurface structures.

Description of the Related Art

Many security threats from a military or law enforcement point of view have an underground aspect. These include clandestine tunnels and bunkers used by enemy forces to hide their activities or tunnels used by smugglers to transport contraband across international boundaries. Also, detection of buried improvised explosive devices and mines would be beneficial to both military personnel and to civilians when, for example, demining former conflict zones. Additionally, the ability to detect subsurface features would be of benefit in geology for mapping subsurface strata and fault lines, in archeology for detecting buried structures and artifacts, and for monitoring and finding natural resources such as subsurface water resources. At least one system has been proposed for using synthetic aperture radar (SAR) to map underground features.

U.S. Pat. No. 9,519,055 issued to Hellsten, on Dec. 13, 2016, which is incorporated herein by reference in its entirety, shows a synthetic aperture radar system for locating underground objects; however, Hellsten does not teach the use of interferometry or the determination of the depth of the underground objects.

Therefore, there is a need to develop an efficient approach to survey large areas for subsurface objects that not only provides the corresponding surface location of the Objects but that also provides the depth of the objects to allow for more efficient planning and resource allocation in dealing with the objects.

SUMMARY

In view of the foregoing, an embodiment herein provides a method for determining the location of a subsurface target including a depth of the subsurface target below a surface, the surface above the subsurface target comprising a target area that is above the subsurface target, the method comprising imaging a scene comprising at least a portion of the target area over the subsurface target using synthetic aperture radar (SAR) imaging along a first path to obtain a first SAR imaging response; performing surface clutter suppression on the first SAR imaging response by applying a polarimetric difference operation to the first SAR imaging response to obtain a first clutter-suppressed image; imaging the scene using SAR imaging along a second path to obtain a second SAR imaging response; performing surface clutter suppression on the second SAR imaging response by applying the polarimetric difference operation to the second SAR imaging response to obtain a second clutter-suppressed image; and applying a subsurface interferometric algorithm to infer the depth of the target below the surface by correlating the first and second clutter-suppressed images obtained along the first and second paths. The polarimetric difference operation does not alter the propagation phase of the target scattered signal. The step of imaging the scene using SAR imaging along a first path comprises imaging the scene using radio waves of a first polarity and imaging the scene using radio waves of a second polarity. Similarly, the step of imaging the scene using SAR imaging along a second path comprises imaging the scene using radio waves of the first polarity and imaging the scene using radio waves of the second polarity. In some examples, the first polarity is horizontal polarity and the second polarity is vertical polarity.

In most real-world applications, the surface being imaged has a roughness. There is a subsurface medium below the surface and below the target area and the target is located within the subsurface medium. The medium may, for example, be soil of a certain moisture content.

The method may comprise imaging a training area scene including at least a portion of a training area using radio waves of the first polarity to obtain a hh-polarized (horizontally polarized) scene image $I_{hh}(\vec{r})$; imaging the training area scene using radio waves of the second polarity to obtain a vv-polarized (vertically polarized) scene image $I_{vv}(\vec{r})$; and deriving a cancellation coefficient $\gamma_{min}(\theta_{inc})$ from the images $I_{hh}(\vec{r})$ and $I_{vv}(\vec{r})$ for the training area scene. The training area should have roughness and subsurface material properties that are similar to the target area and the training area should be devoid of targets at least to depths that are capable of being imaged by the method and the SAR equipment being used.

The step of performing surface clutter suppression on the first SAR imaging response may comprise calculating a first clutter-suppressed image $(I_1^{cs}(\vec{r})$ for the first path by using the relation $I_1^{cs}(\vec{r}) = I_{hh,1}(\vec{r}) - \gamma_{min}(\theta_{inc})I_{vv,1}(\vec{r})$, and the step of performing surface clutter suppression on the second SAR imaging response may comprise calculating a second clutter-suppressed image $(I_2^{cs}(\vec{r})$ for the second path by using the relation $I_2^{cs}(\vec{r}) = I_{hh,2}(\vec{r}) - \gamma_{min}(\theta_{inc})I_{vv,2}(\vec{r})$. In the relations above, $I_{hh,1}(\vec{r})$ is a first scene image of a scene including at least a portion of the target area over the target obtained using radio waves of the first polarity along the first path, $I_{hh,1}(\vec{r})$ is a second scene image of the scene Obtained using radio waves of the second polarity along the first path, $I_{hh,2}(\vec{r})$ is a third scene image of the scene obtained using radio waves of the first polarity along the second path, and $I_{vv,2}(\vec{r})$ is a fourth scene image of the scene obtained using radio waves of the second polarity along the second path.

The cancellation coefficient $\gamma_{min}(\theta_{inc})$ may be derived using $\gamma_{min}(\theta_{inc}) =$ $$\arg\left[\min_{\gamma(\theta_{inc})} \left( \int_S |I_{hh}(\vec{r}) - \gamma(\theta_{inc})I_{vv}(\vec{r})|^2 dS \right)\right].$$

As one alternative, the cancellation coefficient may be calculated using formulas based on the incidence angle, the index of refraction, and the surface roughness of the soil.

The step of applying a subsurface interferometric algorithm to infer the depth of the target below the surface may comprise the step of calculating the interferometric phase using $\Delta\phi(I_1^{cs}(\vec{r}), I_2^{cs}(\vec{r}))=2k_c(-r_{e\!f\!f,1}{}^c+|\vec{r}_1{}^c-\vec{r}|+r_{e\!f\!f,2}{}^c-|\vec{r}_2{}^c-\vec{r}|)$. The step of applying a subsurface interferometric algorithm to infer the depth of the target below the surface may further comprise the step of deducing the depth (d) of a detectable target-associated scattering feature at least for each record corresponding to a pixel of an image of the scene within or including the target area, where the pixel has associated with it an indication of a corresponding detectable target-associated scattering feature, by using $$\Delta\phi(I_1^{cs}(\vec{r}), I_2^{cs}(\vec{r})) = \Delta\phi^t - \Delta\phi_o^t,$$

$$\Delta\phi^t = 2k_c B \sin\left(\alpha - \cos^{-1}\left(\frac{H_1}{r_o}\right)\right) + 2d\text{Re}[\Delta k_{gz}], \text{ and}$$

$$\Delta\phi_o^t = 2k_c B \sin\left(\alpha - \cos^{-1}\left(\frac{H_1}{r_{e\!f\!f,1}}\right)\right).$$

Another embodiment provides a system for determining the location of a subsurface target including the depth of the subsurface target below the surface. The surface above the subsurface target comprises a target area that is above the subsurface target. The system comprises one or more radar transceivers installed on one or more mobile platforms, the one or more transceivers being configured to image a scene including at least a portion of the target area over the target with radio waves of a first polarity and the one or more transceivers being configured to image the scene with radio waves of a second polarity; and a processing module configured to receive imaging data from the one or more transceivers. The processing module may be programmable and comprise a processor, memory, data storage means, input means, and output means. The processing module may be configured to include a clutter suppression module, an interferometric analysis module, and a depth profile determination module.

The clutter suppression module may be configured to perform surface clutter suppression on a SAR imaging response by applying a polarimetric difference operation to the SAR imaging response to obtain a clutter-suppressed image. The interferometric analysis module may be configured to calculate the interferometric phase based on a first clutter-suppressed image and a second clutter-suppressed image to generate interferometric data. The interferometric analysis module may also be configured to obtain the first clutter-suppressed image and the second clutter-suppressed image from the clutter suppression module. The first clutter-suppressed image may be of a scene including at least a portion of the target area over the target obtained along a first path, and the second clutter-suppressed image may be of the same scene obtained along a second path.

The depth profile determination module may be configured to calculate the depth of a detectable target-associated scattering feature at least for each record in the interferometric data corresponding to a pixel of an image of the scene within or including the target area based on the interferometric data, where the pixel has associated with it an indication of a corresponding detectable target-associated scattering feature.

The processing module may further comprise a cancellation coefficient calculation module. The cancellation coefficient calculation module may be configured to receive a hh-polarized scene image $I_{hh}(\vec{r})$ of a training area scene including at least a portion of the training area obtained using radio waves of the first polarity, and the cancellation coefficient calculation module may be configured to receive a vv-polarized scene image $I_{vv}(\vec{r})$ of the training area scene obtained using radio waves of the second polarity. Also, the cancellation coefficient calculation module may be configured to derive a cancellation coefficient $\gamma_{min}(\theta_{inc})$ from the images $I_{hh}(\vec{r})$ and $I_{vv}(\vec{r})$ of the training area scene.

In some embodiments, the processing module may be configured to control the clutter suppression module to calculate a first clutter-suppressed image ($I_1^{cs}(\vec{r})$) for the first path by using the relation $I_1^{cs}(\vec{r})=I_{hh,1}(\vec{r})-\gamma_{min}(\theta_{inc})I_{vv,1}(\vec{r})$, and a second clutter-suppressed image ($I_2^{cs}(\vec{r})$) for the second path by using the relation $I_2^{cs}(\vec{r})$ $I_{hh,2}(\vec{r})-\gamma_{min}(\theta_{inc})I_{vv,2}(\vec{r})$. In the relations above, $I_{hh,1}(\vec{r})$ is a first scene image of a scene including at least a portion of the target area over the subsurface target obtained using radio waves of the first polarity along the first path, $I_{vv,1}(\vec{r})$ is a second scene image of the scene obtained using radio waves of the second polarity along the first path, $I_{hh,2}(\vec{r})$ is a third scene image of the scene obtained using radio waves of the first polarity along the second path, and $I_{vv,2}(\vec{r})$ is a fourth scene image of the scene obtained using radio waves of the second polarity along the second path.

The interferometric analysis module may be configured to calculate the interferometric phase using $\Delta\phi(I_1^{cs}(\vec{r}), I_2^{cs}(\vec{r}))=2k_c(-r_{e\!f\!f,1}{}^c+|\vec{r}_1{}^c-\vec{r}|+r_{e\!f\!f,2}{}^c-|\vec{r}_2{}^c-\vec{r}|)$. The depth profile determination module may be configured to calculate the depth (d) of the detectable target-associated scattering feature at least for each record of the interferometric data corresponding to a pixel of an image of the scene within or including the target area; where the pixel has associated therewith an indication of a corresponding detectable target-associated scattering feature, by using $$\Delta\phi(I_1^{cs}(\vec{r}), I_2^{cs}(\vec{r})) = \Delta\phi^t - \Delta\phi_o^t,$$

$$\Delta\phi^t = 2k_c B \sin\left(\alpha - \cos^{-1}\left(\frac{H_1}{H_o}\right)\right) + 2d\text{Re}[\Delta k_{gz}], \text{ and}$$

$$\Delta\phi_o^t = 2k_c B \sin\left(\alpha - \cos^{-1}\left(\frac{H_1}{r_{e\!f\!f,1}}\right)\right).$$

BRIEF DESCRIPTION OF THE DRAWINGS

The patent or patent application file contains at least one drawing executed in color, Copies of this patent or patent application publication with color drawings will be provided by the Office upon request and payment of the necessary fee.

The embodiments herein will be better understood from the following detailed description with reference to the drawings, in which:

FIGS. 4A-4G illustrate color-coded maps of a target scene showing the results of various stages of an embodiment of the method for determining the location of a subsurface target, including the depth of the subsurface target below the surface, for a subsurface target located under a rough surface;

FIGS. 5-12 are flow diagrams illustrating embodiments of the method for determining the location of a subsurface target, including the depth of the subsurface target below the surface, for a subsurface target located under a rough surface;

DETAILED DESCRIPTION

Figure 1A:
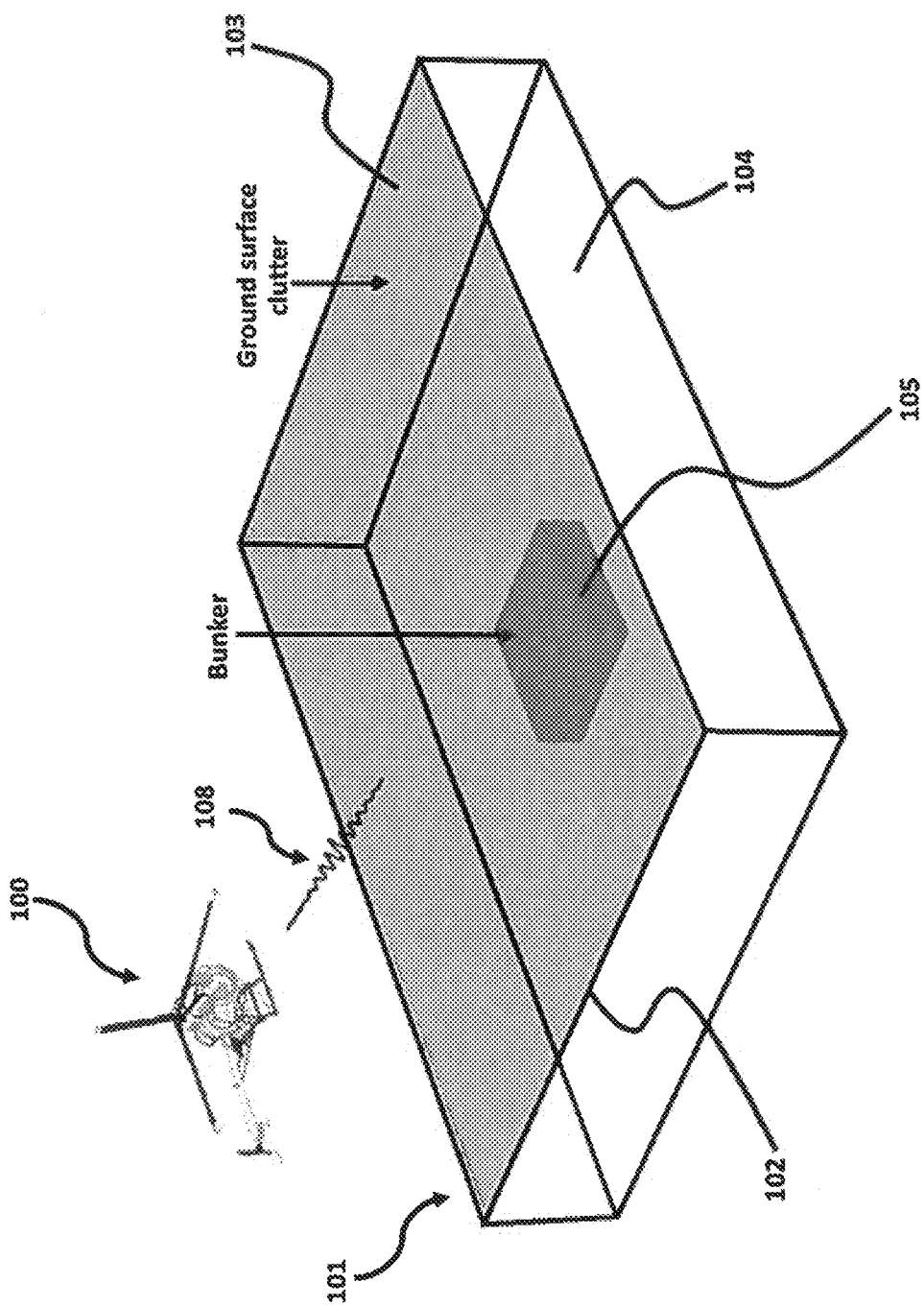
FIGS. 1A-1B illustrate environmental views of an embodiment of the method and system for determining the location of a subsurface target including the depth of the subsurface target below the surface.
Figure 1B:
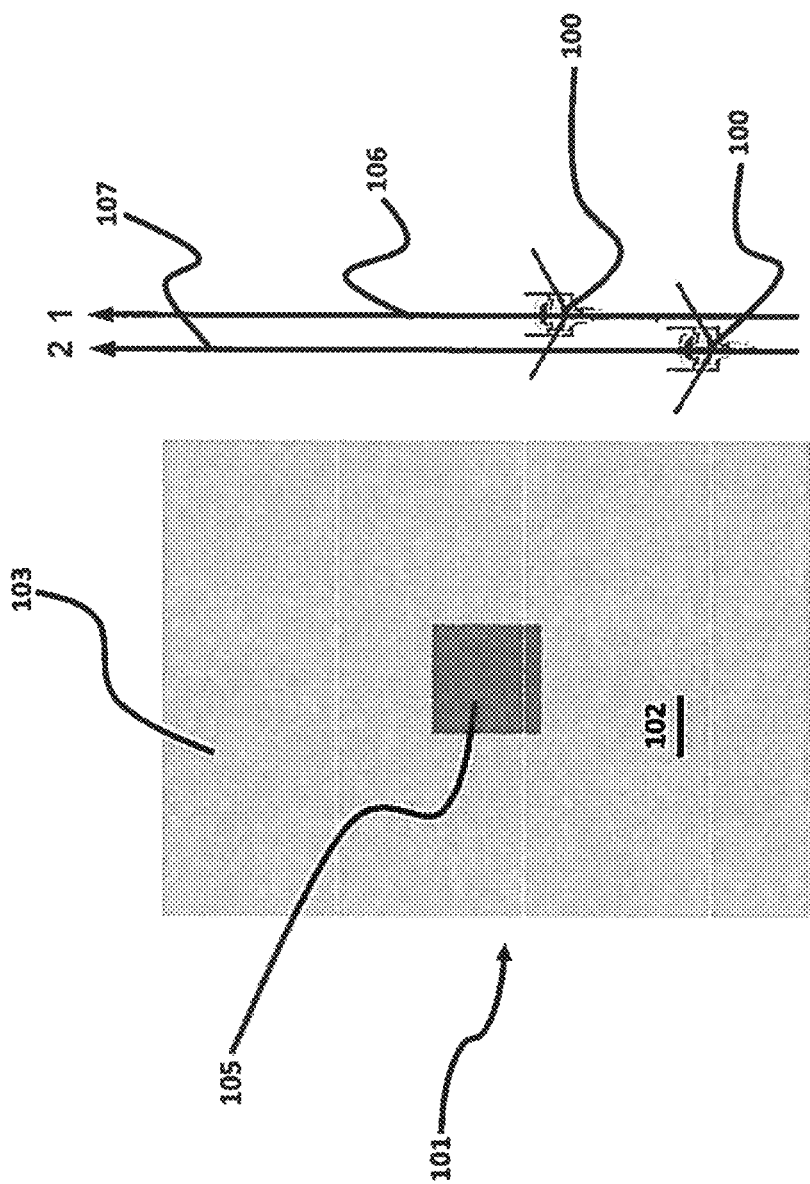
Figure 2A:
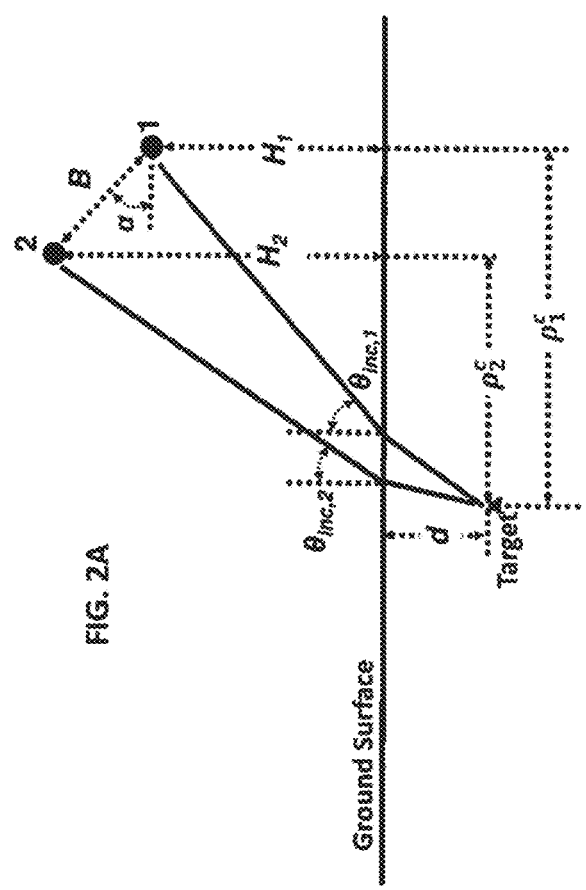
FIGS. 2A-2B illustrate further diagrammatic environmental views of an embodiment of the method and system for determining the location of a subsurface target including the depth of the subsurface target below the surface.
Figure 2B:
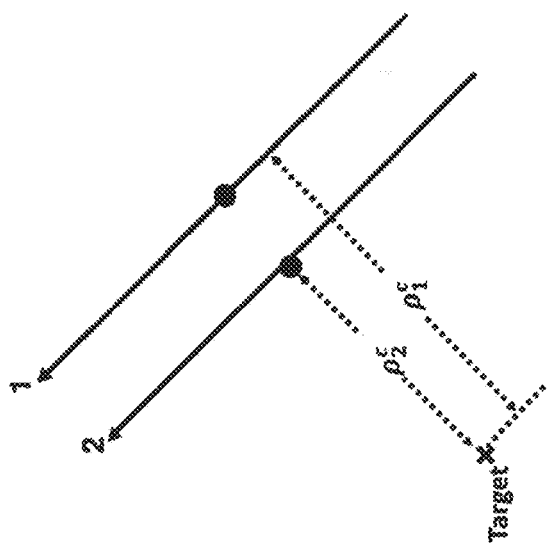

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Some of the embodiments herein are directed to a new algorithm for detecting and imaging buried targets from an airborne ground-penetrating radar system. The method using the algorithm works in the presence of ground surface clutter, and does not require measurements from many elevation angles to infer target depth. As such, the overall algorithm is ideal for localizing underground structures such as bunkers.

Some of the embodiments herein exploit a subsurface interferometric synthetic aperture radar (InSAR) imaging technique for the detection and localization of clandestine underground facilities in the presence of ground surface clutter. Some of the embodiments herein comprise a two-step procedure. First, surface clutter suppression is performed with a polarimetric difference operation that does not alter the propagation phase of the target scattered signal, and then a subsurface interferometric algorithm is applied to infer target depth by correlating the clutter-suppressed images obtained at two observation angles.

Although InSAR is a generally well-known technology, the prior art has been focused on terrain mapping and above ground targets. InSAR has not previously been applied to the detection of subsurface objects and the model equations and algorithms for determining subsurface target depth retrieval and imaging have not been previously developed.

The effectiveness of the embodiments herein in detecting and localizing a buried target has been investigated with, simulated monostatic scattering responses obtained from a full-wave electromagnetic solver. The detection, imaging, and localization algorithm may be written in Matlab script.

The embodiments herein may be used, without limitation, to detect bunkers and other subterranean structures buried under a ground with surface clutter. Other applications of the embodiments herein may include, without limitation, airborne subsurface mapping, archeological surveys, border security, etc.

Although InSAR has been applied to terrain elevation mapping in the past, few studies have considered its potential use for the problem of buried target detection. As the target return can be significantly attenuated by the soil medium, ground surface clutter mitigation becomes a critical first step in establishing a sufficient target-to-clutter ratio needed for further signal and image processing, According to the small perturbation method, the co-polarized backscattering coefficients of a slightly rough surface at incidence angle $\theta_{inc}$ are related as $\sigma_{hh}^o = \gamma(\theta_{inc})\sigma_{vv}^o$, where $\gamma(\theta_{inc})$ is a quantity that is independent of frequency (to wit, this presupposes the soil properties are frequency-independent). As such, it is postulated that a clutter-suppressed, single-pass SAR imaging response, $I^{cs}(\vec{r})$ can be realized with the polarimetric difference operation [1]

$$I^{cs}(\vec{r}) = I_{hh}(\vec{r}) - \gamma(\theta_{inc})I_{vv}(\vec{r}) \qquad (1)$$

in which $I_{pp}(\vec{r})$ is the pp-polarized scene image; and $I_{pp}(\vec{r}) \approx I_{pp}^{t}(\vec{r}) + I_{pp}^{s}(\vec{r})$, where $I_{pp}^{t}(\vec{r})$ is the target image in the presence of a flat half-space and $I_{pp}^{s}(\vec{r})$ is the rough surface image.

Note that in practice, the dielectric properties of the ground are a function of frequency; therefore, it is more appropriate to employ an effective $\gamma(\theta_{inc})$, averaged over the imaging hand, in (1) instead; this approximate cancellation coefficient can be derived directly from the images as follows:

$$\gamma_{min}(\theta_{inc}) = \arg\left[\min_{\gamma(\theta_{inc})} \left(\int_S |I_{hh}(\vec{r}) - \gamma(\theta_{inc})I_{vv}(\vec{r})|^2 dS\right)\right], \qquad (2)$$

where S is the image extent for a training scene that contains only the clutter. As the operation in (1) does not distort the propagation phase of the target return, a subsurface InSAR algorithm for the half-space problem can be subsequently applied to the clutter-suppressed images.

With the two-pass sensing geometry as defined in FIGS. 1A-2B, the relationship between the interferometric, phase of a subsurface target and the radar parameters can be established in the imaging domain as follows, First note that the monostatic imaging functional for each pass is provided by [2], [3]

$$I_{pp,i}(\vec{r}) = \Sigma_{k_o}\Sigma_{\vec{r}_i} E_{pp,i}(\vec{r}_i, k_o)e^{+j2k_o|\vec{r}_i - \vec{r}|}, \qquad (3)$$

where i=1, 2 is the pass number, $E_{pp,i}(\vec{r}_i, k_o)$ the pp-polarized scattered field from the target, $\vec{r}_i$ the transceiver position, and $k_o$ the free-space propagation wavenumber.

For a point target at depth d, the backscattered field as observed at the transceiver is of the form [4]

$$E_{pp,i}(\vec{r}_i, k_o) \propto e^{-j2k_o r_{eff,i}}, r_{eff,i} = (H_i^2 + \rho_i^2)^{1/2} + dRe[k_{gz,i}]/k_o \quad (4)$$

in which $H_i$ is the radar altitude, $\rho_i$ the horizontal distance to the target, and $k_{gz,i}$ the vertical propagation wavenumber in the pound.

After expanding the phase terms in (3) for each pass about the response obtained at the center of the observation aperture, it can be shown that the first order term of the target image interferometric phase for the two-pass configuration in FIG. 1 is given by $$\Delta\phi(I_{pp,1}(\vec{r}), I_{pp,2}(\vec{r})) = \quad (5)$$

$$L(I_{pp,1}(\vec{r}) \cdot I_{pp,2}^*(\vec{r})) = 2k_c(-r_{eff,1}^c + |\vec{r}_1^c - \vec{r}| + r_{eff,2}^c - |\vec{r}_2^c - \vec{r}|),$$

where $k_c$ is the wavenumber at the center frequency of the hand, $r_{eff,i}^c$ and $\vec{r}_i^c$ denote the previously defined parameters evaluated at the center of the observation aperture.

With the imaging plane at the ground plane, for two passes separated by baseline length B and tilt angle α (and assuming the difference between the elevation angles of the two passes, $\theta_{inc,1}$ and $\theta_{inc,2}$, is small), it can be shown that the phase interferogram can be simplified to $$\Delta\phi(I_1^{cs}(\vec{r}), I_2^{cs}(\vec{r})) = \Delta\phi^t - \Delta\phi_o^t, \quad (6)$$
with $$\Delta\phi^t = 2k_c B \sin\left(\alpha - \cos^{-1}\left(\frac{H_1}{H_o}\right)\right) + 2dRe[\Delta k_{gz}]; \quad (7)$$

$$\Delta\phi_o^t = 2k_c B \sin\left(\alpha - \cos^{-1}\left(\frac{H_1}{r_{eff,1}}\right)\right); \quad (8)$$

where $r_o$ is the radar distance to the pixel located on the ground plane directly above the target; and $\Delta k_{gz}$ is the difference between the two vertical propagation wavenumbers in the ground corresponding to the two observation angles.

The expressions (6)-(8) also hold for clutter-suppressed images $I_1^{cs}(\vec{r})$ and $I_2^{cs}(\vec{r})$, Hence, from the above developments, it is seen that once the interferometric phase is known, the target depth, or the scene depth profile, can be deduced, for a scene with or without surface clutter.

The detection performance of the subsurface InSAR algorithm put forth is verified with full-wave simulation results. In the first example, the subsurface target is taken to be a rectangular box-shaped void (i.e., a bunker, FIGS. 1A and 1B) with dimensions 10 m×10 m×3 m (the outline of the target projected on the xy-plane is indicated in FIGS. 3A-4G); the top of the target is at 6 m depth. The two-pass sensing geometry assumed has the following parameters: B=200 m, α=60°, $H_1$=5 km, $\rho_1^c$=5 km, and f=[20 MHz, 150 MHz]; the two Eight paths are parallel to the y-axis and the radar is pointed toward −x̂ (negative x direction). The soil has relative dielectric constant and conductivity ($\varepsilon_r$, $\sigma_d$) of (4, 5 mS/m). Far-field simulations are first carried out using a 3D finite-difference time domain solver [5]-[8]; subsequently, the scene image at each pass is generated with the near-field imaging functional in (3) after the backscattered fields have been converted to their near-field equivalents in accordance with the given sensing geometry parameters.

Figure 3B:
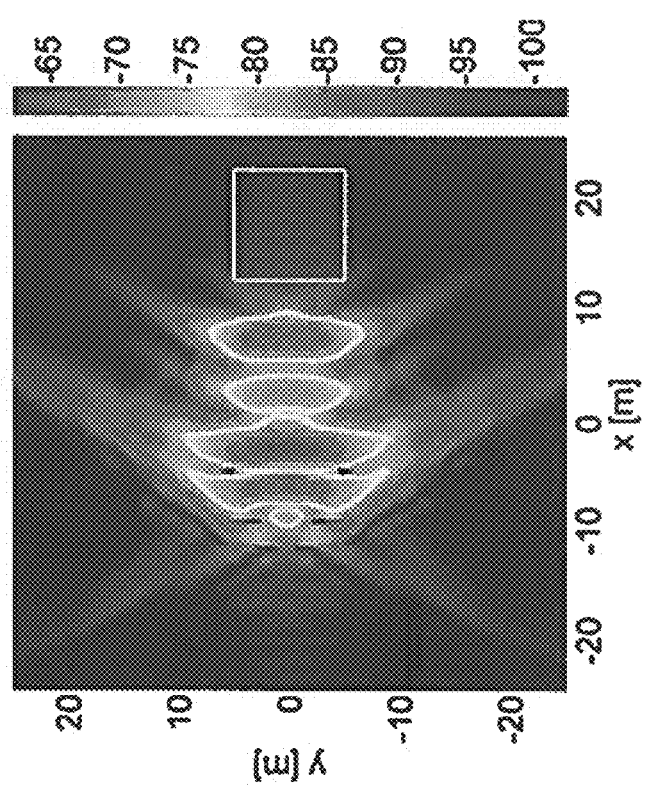
FIGS. 3A-3H illustrate color-coded maps of a target scene showing the results of various stages of an embodiment of the method for determining the location of a subsurface target, including the depth of the subsurface target below the surface, for a subsurface target located under a smooth surface.
Figure 3A:
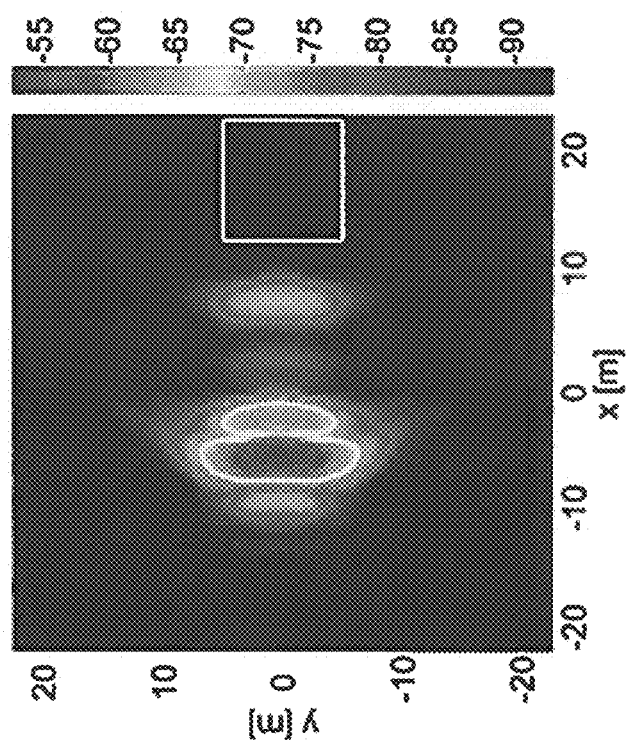
Figure 3C:
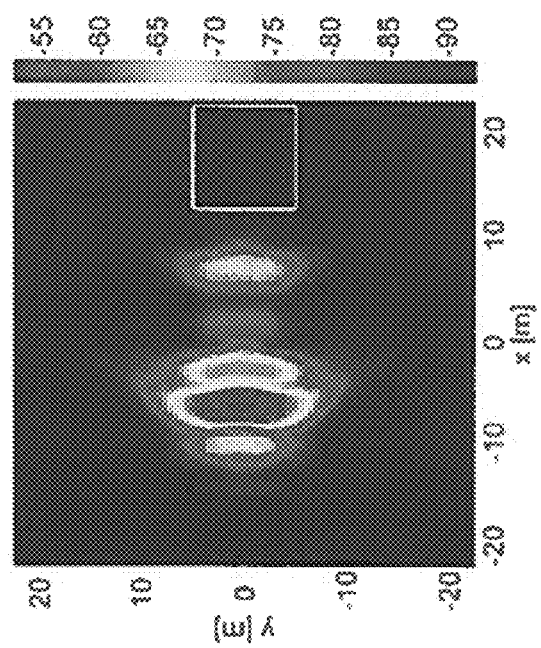
Figure 3D:
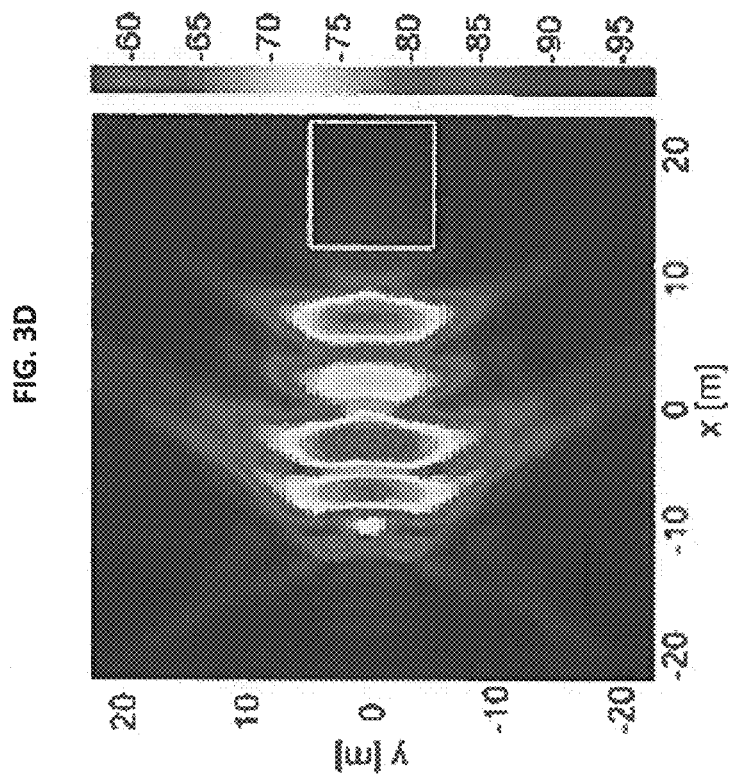

For comparison purposes, the depth profile mapping algorithm presented is first applied to a scene without clutter—that is, as an initial step of the analysis, it is instructive to understand the scattering phenomenology of the target located in a ground with a flat interface. The conventional co-polarized 2D SAR images at the ground (z=0) plane are shown in FIGS. 3A-3H. It is seen that the primary backscattering responses are from the four edges of the box oriented parallel to the flight paths, with the strongest response from the bottom "hack" edge, the sides adjacent to which forming a dihedral reflector. The intensity responses from one of the passes are shown in FIGS. 3A-3B, and those from the other pass are similar and are shown in FIGS. 3C-3D.

As the images are formed on the ground plane, the subsurface target imaging responses are displaced down range from the true locations of their scattering phase centers; in closed form this displacement—derived for a point scatterer—is given by $$\Delta x \approx -\frac{d}{\sin\theta_{inc,1}} Re\left[\sqrt{\varepsilon_{r,c} - \sin^2\theta_{inc,1}}\right], \quad (9)$$

where $\varepsilon_{r,c}$ is the complex relative dielectric constant of the ground at the center frequency.

Figure 3G:
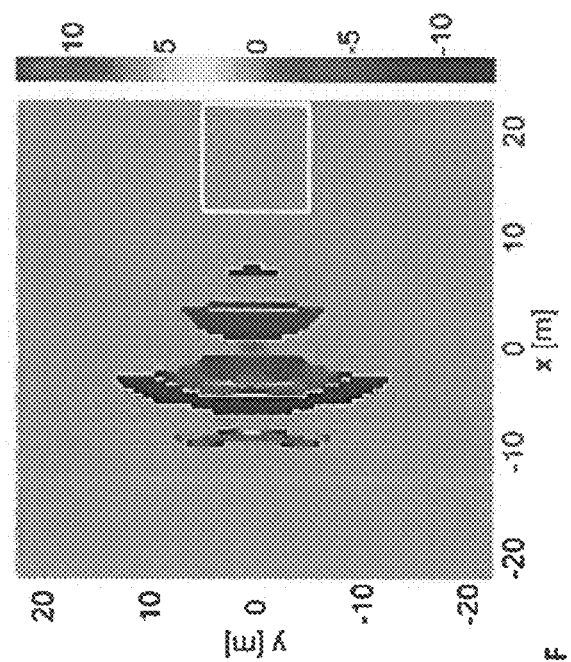
Figure 3E:
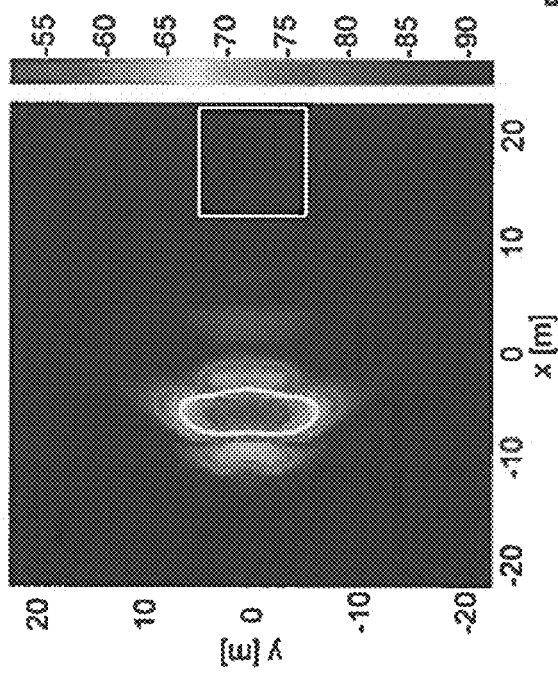
Figure 3F:
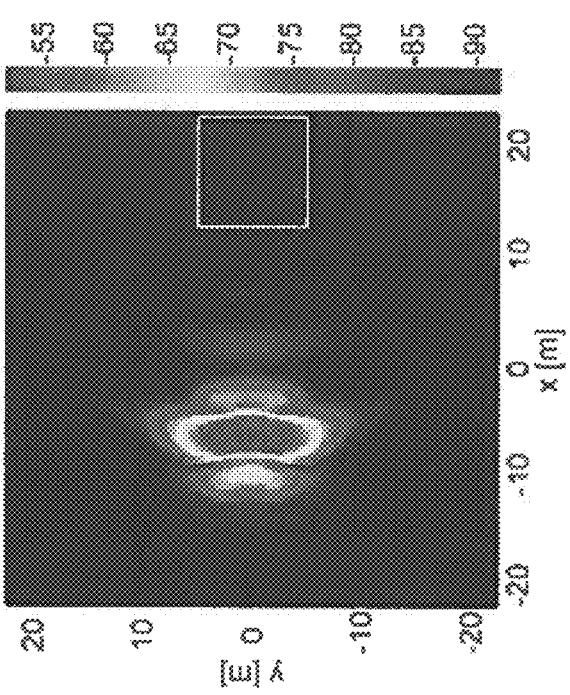
Figure 3H:
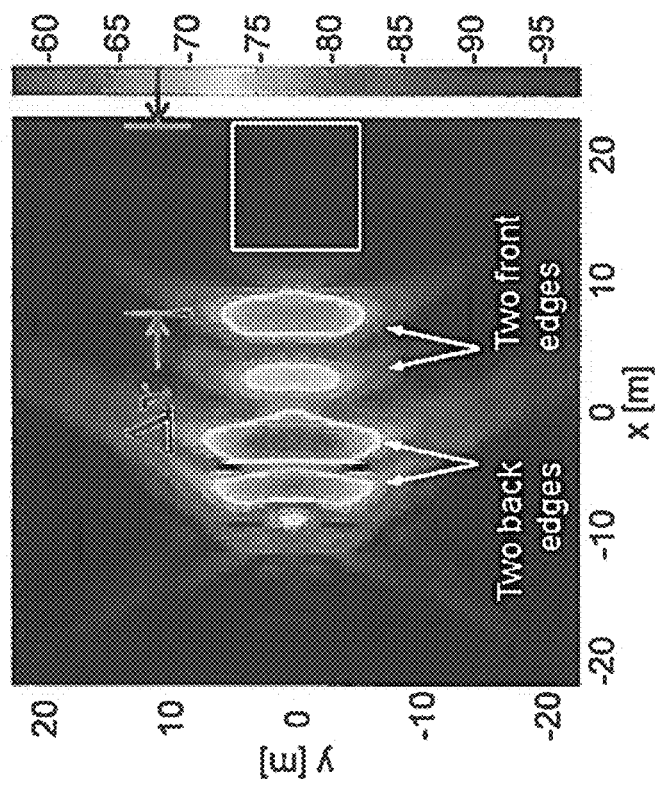

The resultant from the polarimetric difference operation in (1) is displayed in FIGS. 3E and 3F and, and the target depth profile deduced using (6)-(8) is shown in FIG. 3G, where it is seen that the different scattering components are detected at approximately the correct depths.

Figure 4B:
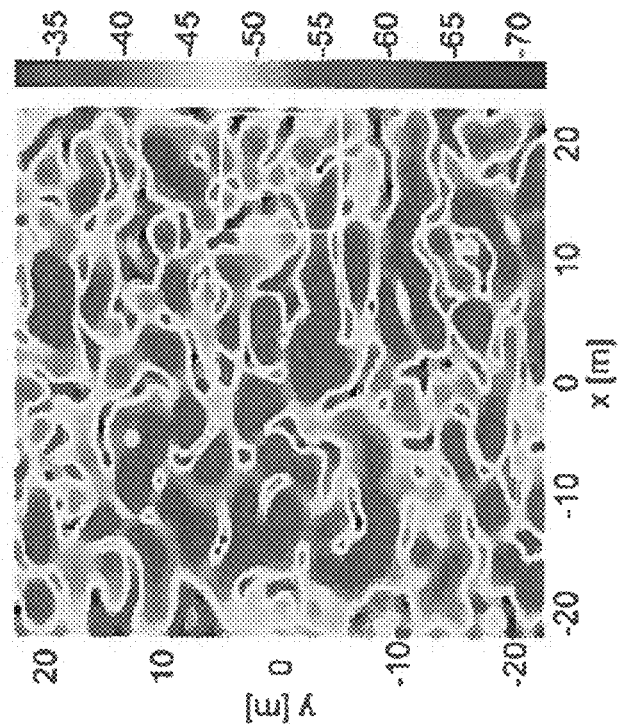
Figure 4A:
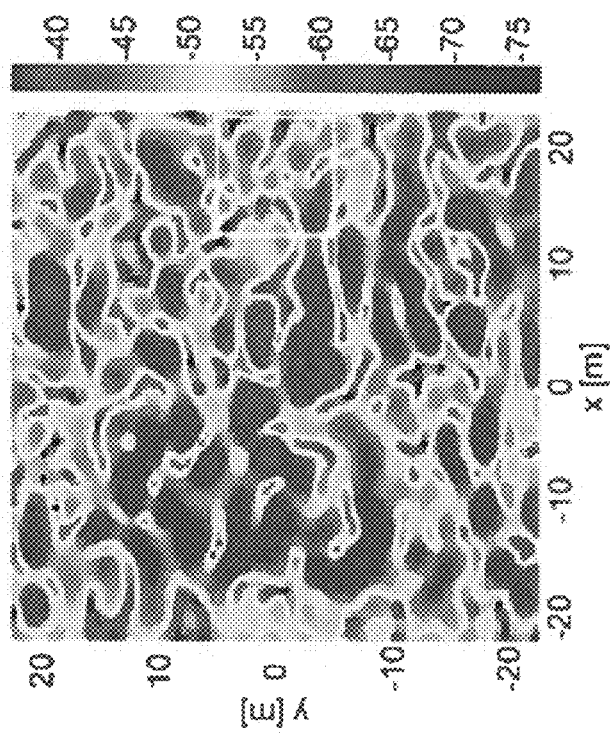
Figure 4G:
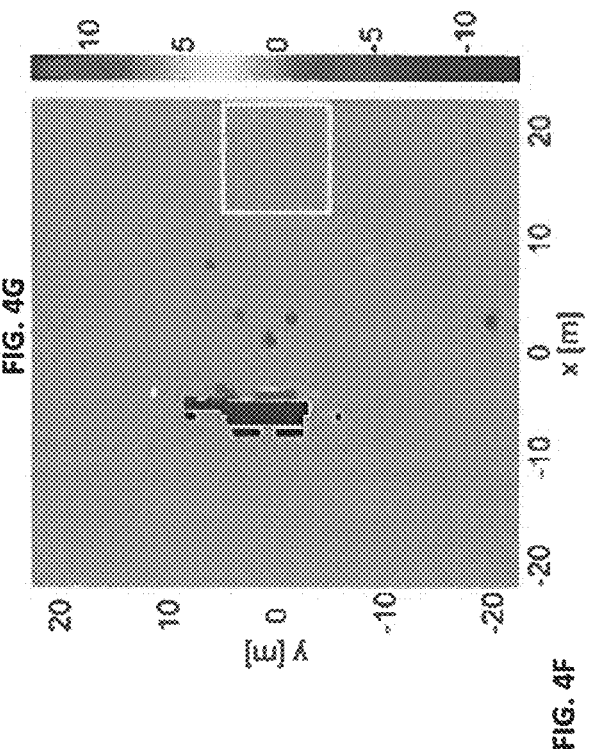
Figure 4E:
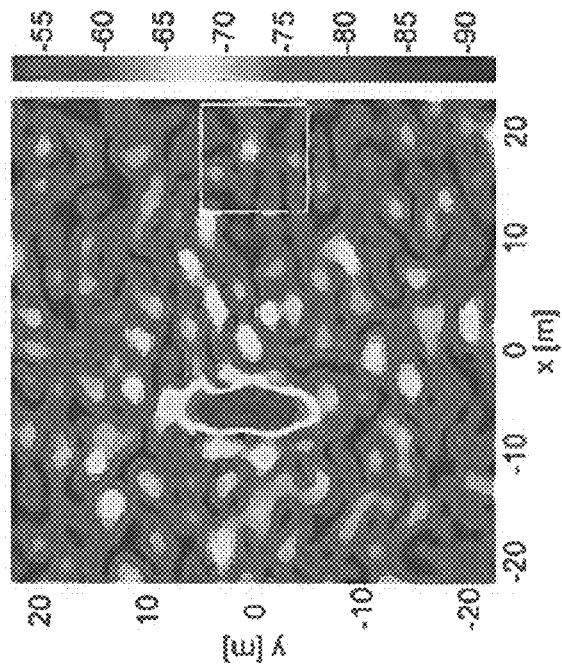
Figure 4F:
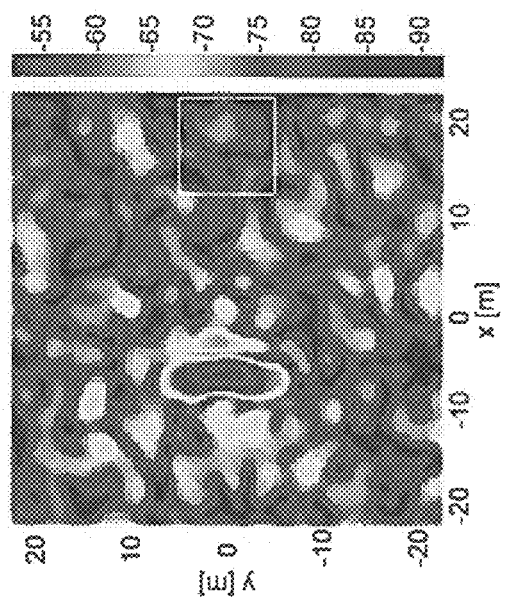
Figure 5:
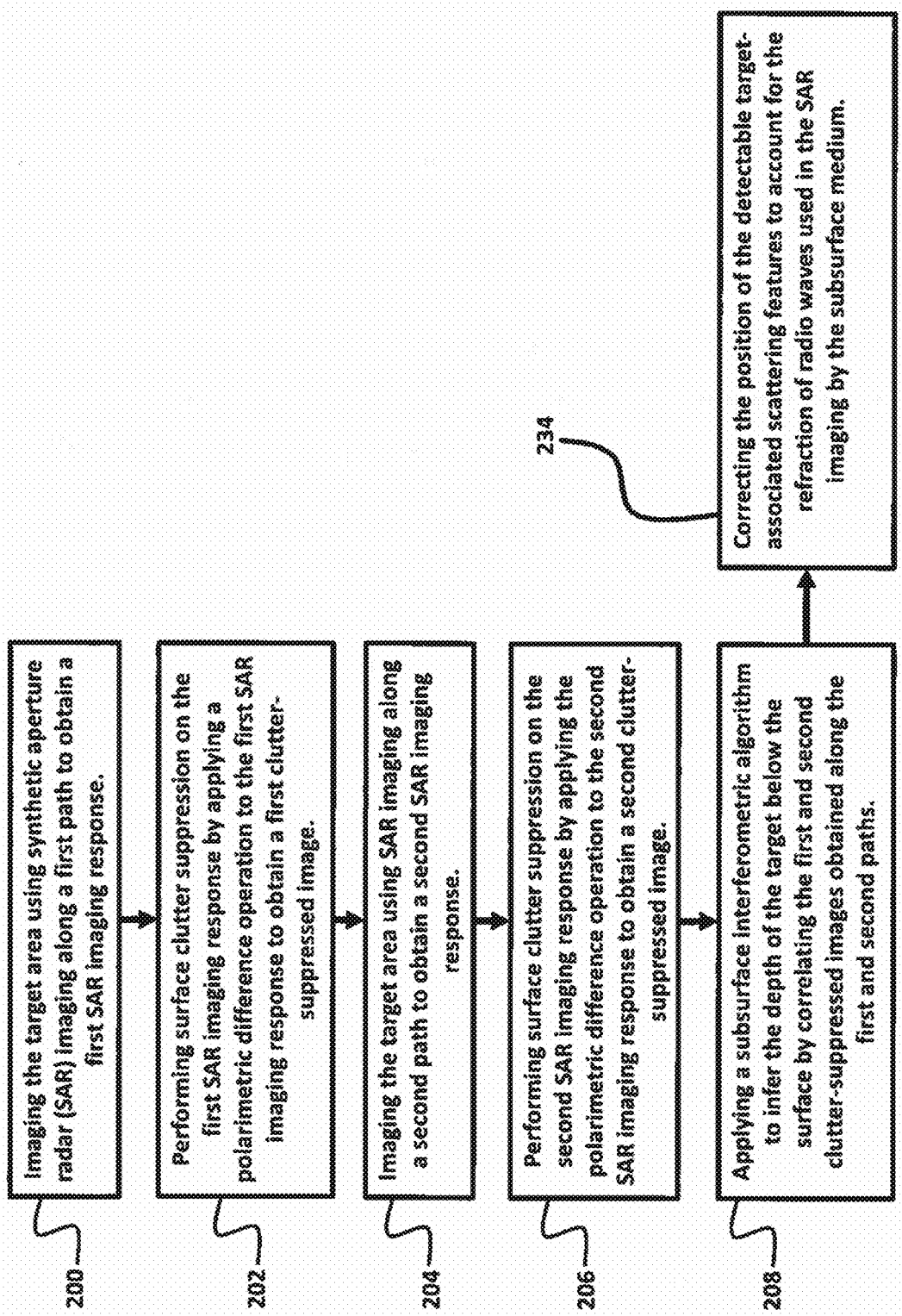
Figure 8:
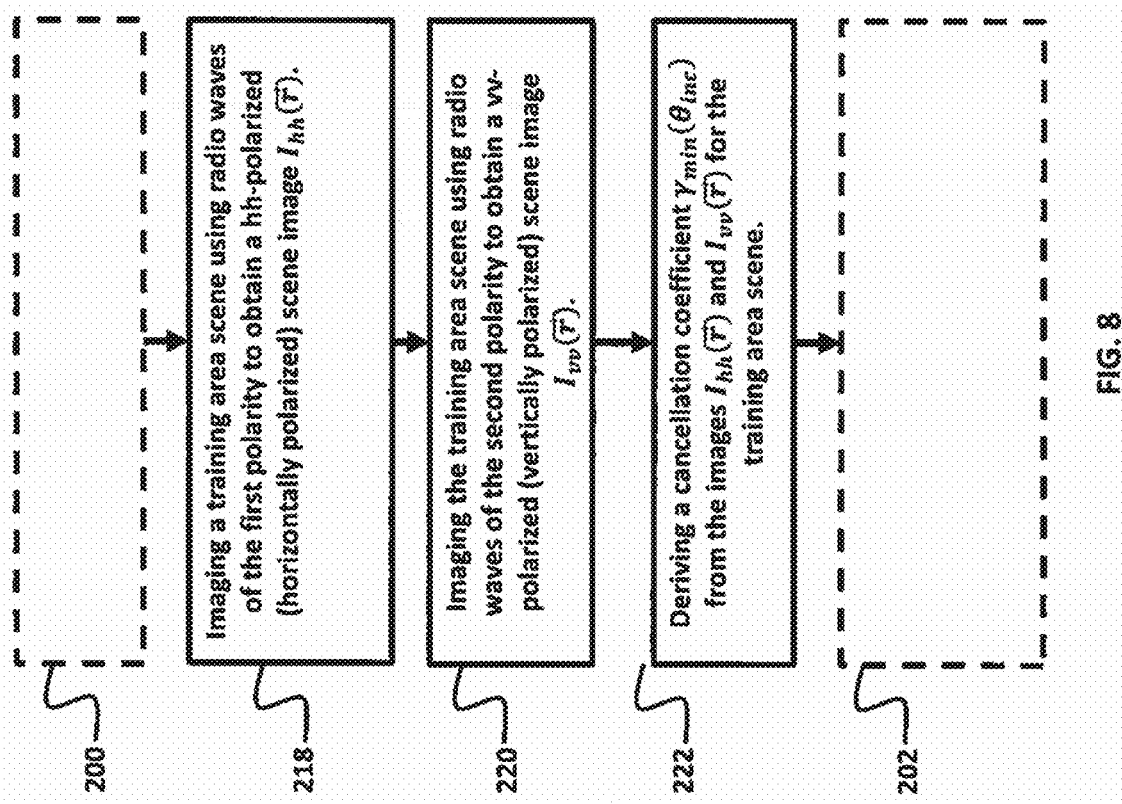
Figure 11:
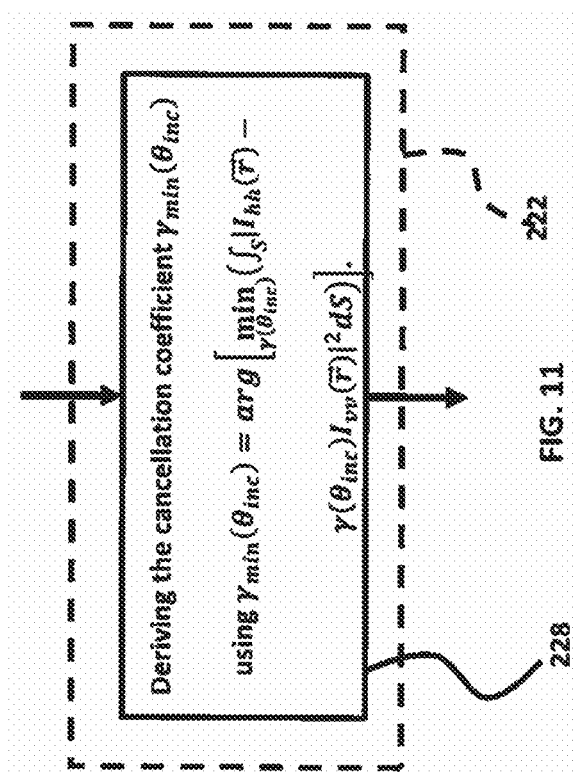
Figure 12:
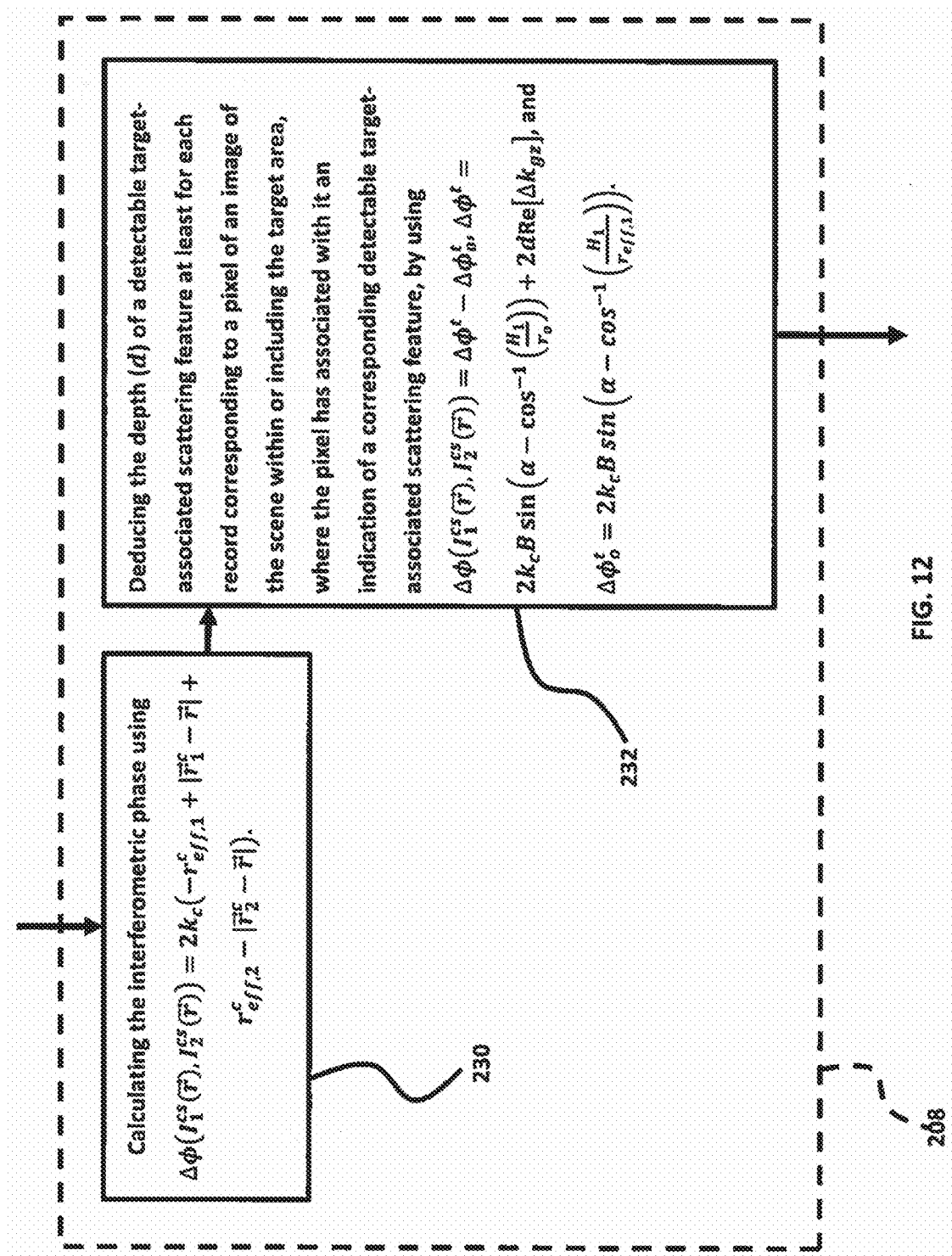

Next, a random rough surface (with rms height of 1 cm, correlation length of 50 cm, and power-law spectrum) is included in the model. As evident from FIGS. 4A-4D, the target responses are completely obscured by the surface clutter response; nevertheless, as seen in FIGS. 4E-4F, the suppression operation works very well in this case in attenuating the clutter return and bringing out at least the main (dihedral) scattering component. The subsurface InSAR technique is again success fill in determining the depth of that dominant scattering phase center from the clutter-suppressed imaging responses as shown in FIG. 4G.

Referring to FIGS. 5-12, an embodiment herein provides a method for determining the location of a subsurface target including a depth of the subsurface target below a surface, the surface above the subsurface target comprising a target area that is above the subsurface target, the method comprising imaging (200) a scene comprising at least a portion of the target area, the scene at least extending over a portion of the subsurface target, using synthetic aperture radar (SAR) imaging along a first path to obtain a first SAR imaging response; performing (202) surface clutter suppression on the first SAR imaging response by applying a polarimetric difference operation to the first SAR imaging response to obtain a first clutter-suppressed image; imaging (204) the scene using SAR imaging along a second path to obtain a second SAR imaging response; performing (206) surface clutter suppression on the second SAR imaging response by applying the polarimetric difference operation to the second SAR imaging response to obtain a second clutter-suppressed image; and applying (208) a subsurface interferometric algorithm to infer the depth of the target below the surface by correlating the first and second clutter-suppressed images obtained along the first and second paths. The polarimetric difference operation does not alter the propagation phase of the target scattered signal. The step of imaging (200) the scene using SAR imaging along a first path comprises imaging (210) the scene using radio waves of a first polarity and imaging (212) the scene using radio waves of a second polarity. Similarly, the step of imaging (204) the scene using SAR imaging along a second path comprises imaging (214) the scene using radio waves of the first polarity and imaging (216) the scene using radio waves of the second polarity. In some examples, the first polarity is horizontal polarity and the second polarity is vertical polarity.

In most real-world applications, the surface being imaged has a roughness. There is a subsurface medium below the surface and below the target area and the target is located within the subsurface medium. The medium may, for example, be soil of a certain moisture content.

The method may comprise imaging (218) a training area scene including at least a portion of a training area using radio waves of the first polarity to obtain a hh polarized (horizontally polarized) scene image $I_{hh}(\vec{r})$ imaging (220) the training area scene using radio waves of the second polarity to obtain a vv polarized (vertically polarized) scene image $I_{vv}(\vec{r})$; and deriving (222) a cancellation coefficient $\gamma_{min}(\theta_{inc})$ from the images $I_{hh}(\vec{r})$ and $I_{vv}(\vec{r})$ for the training area scene. The training area should have roughness and subsurface material properties that are similar to the target area and the training area should be devoid of subsurface targets at least to depths that are capable of being imaged by the method and the SAR equipment being used.

The step of performing (202) surface clutter suppression on the first SAR imaging response may comprise calculating (224) a first clutter-suppressed image $(I_1^{cs}(\vec{r}))$ for the first path by using the relation $I_1^{cs} = I_{hh,1}(\vec{r}) - \gamma_{min}(\theta_{inc})I_{vv,2}(\vec{r})$, and the step of performing (206) surface clutter suppression on the second SAR imaging response may comprise calculating (226) a second clutter-suppressed image $(I_2^{cs}(\vec{r}))$ for the second path by using the relation $I_2^{cs}(\vec{r}) = I_{hh,2}(\vec{r}) - \gamma_{min}(\theta_{inc})I_{vv,2}(\vec{r})$. In the relations above, $I_{hh,1}(\vec{r})$ is a first scene image of a scene including at least a portion of the target area, the scene extending over at least a portion of the target, obtained using radio waves of the first polarity along the first path, $I_{vv,1}(\vec{r})$ is a second scene image of the scene obtained using radio waves of the second polarity along the first path, $I_{hh,2}(\vec{r})$ is a third scene image of the scene obtained using radio waves of the first polarity along the second path, and $I_{vv,2}(\vec{r})$ is a fourth scene image of the scene obtained using radio waves of the second polarity along the second path.

The cancellation coefficient $\gamma_{min}(\theta_{inc})$ may be derived (228) using $$\gamma_{min}(\theta_{inc}) = \arg\left[\min_{\gamma(\theta_{inc})}\left(\int_S |I_{hh}(\vec{r}) - \gamma(\theta_{inc})I_{vv}(\vec{r})|^2 dS\right)\right].$$

As one alternative, the cancellation coefficient may be calculated using formulas based on the incidence angle, the index of refraction, and the surface roughness of the soil.

The step of applying (208) a subsurface interferometric algorithm to infer the depth of the target below the surface may comprise the step of calculating (230) the interferometric phase using $\Delta\phi(I_1^{cs}(\vec{r})) = 2k_c(-r_{\mathit{eff},1}^c + |\vec{r}_1^c - \vec{r}| + r_{\mathit{eff},2}^c - |\vec{r}_2^c - \vec{r}|)$. The step of applying (208) a subsurface interferometric algorithm to infer the depth of the target below the surface may further comprise the step of deducing (232) the depth (d) of a detectable target-associated scattering feature at least for each record corresponding to a pixel of an image of the scene within or including the target area, where the pixel has associated with it an indication of a corresponding detectable target-associated scattering feature, by using $$\Delta\phi(I_1^{cs}(\vec{r}), I_2^{cs}(\vec{r})) = \Delta\phi^t - \Delta\phi_o^t,$$

$$\Delta\phi^t = 2k_c B \sin\left(\alpha - \cos^{-1}\left(\frac{H_1}{H_o}\right)\right) + 2d\mathrm{Re}[\Delta k_{gz}], \text{ and}$$

$$\Delta\phi_o^t = 2k_c B \sin\left(\alpha - \cos^{-1}\left(\frac{H_1}{r_{\mathit{eff},1}}\right)\right).$$

The method may comprise the step of correcting (234) the position of the detectable target-associated scattering features to account for the refraction of radio waves used in the SAR imaging by the subsurface medium.

Referring to FIGS. 1A, 1B, 2A, 2B, and 13-15, another embodiment provides a system for determining the location of a subsurface target 105 including the depth d of the subsurface target below the surface 102. The surface 102 above the subsurface target 105 comprises a target area 101 that is above the subsurface target 105. The system comprises one or more radar transceivers 109, 110 installed on one or more mobile platforms 100, the one or more transceivers 109, 110 being configured to image a scene 103, which includes at least a portion of the target area 101 and extends over at least a portion of the target 105, with radio waves 108 of a first polarity and the one or more transceivers being configured to image the scene with radio waves 108 of a second polarity; and a processing module 120 configured to receive imaging data from the one or more transceivers 109, 110. The processing module 120 may be programmable and comprise a processor 132, memory 134, data storage means 136, input means 138, output means 140, and input/output circuitry 142.

Figure 13:
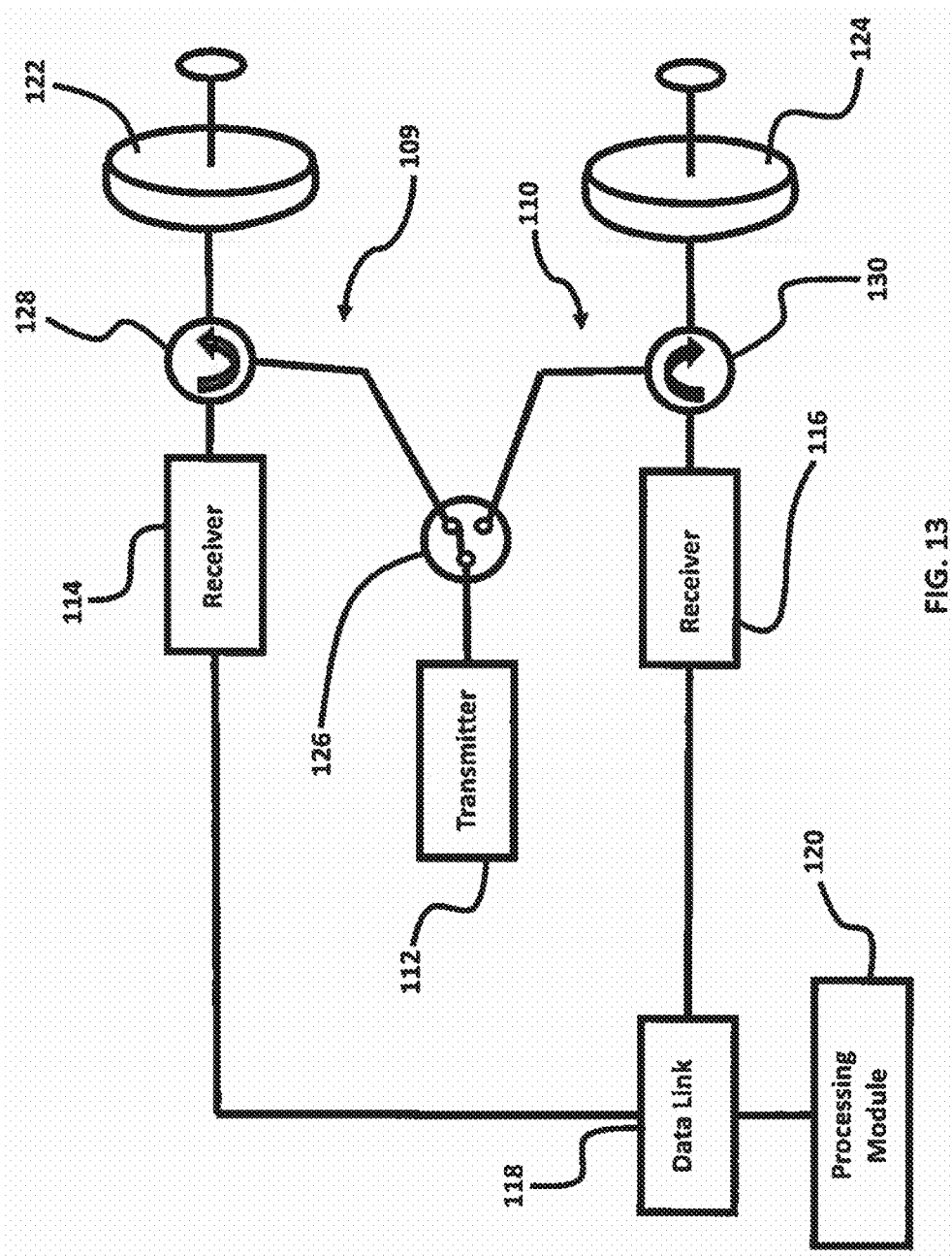
FIG. 13 is a simplified block diagram schematically illustrating an embodiment of the radar system for use with an embodiment of the system for determining the location of a subsurface target including the depth of the subsurface target below the surface.
Figure 14:
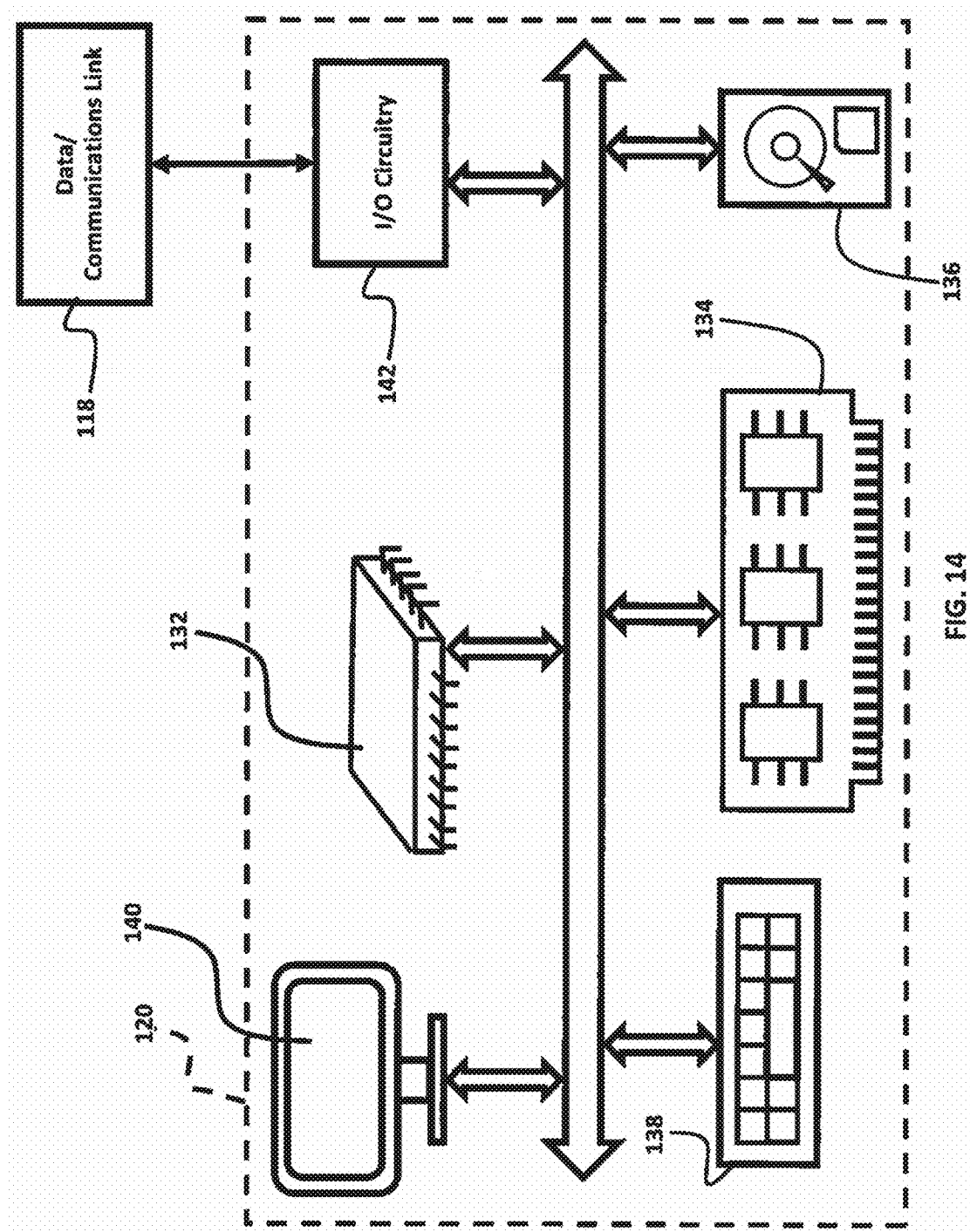
FIG. 14 is a component block diagram illustrating an embodiment of the system for determining the location of a subsurface target including the depth of the subsurface target below the surface.
Figure 15:
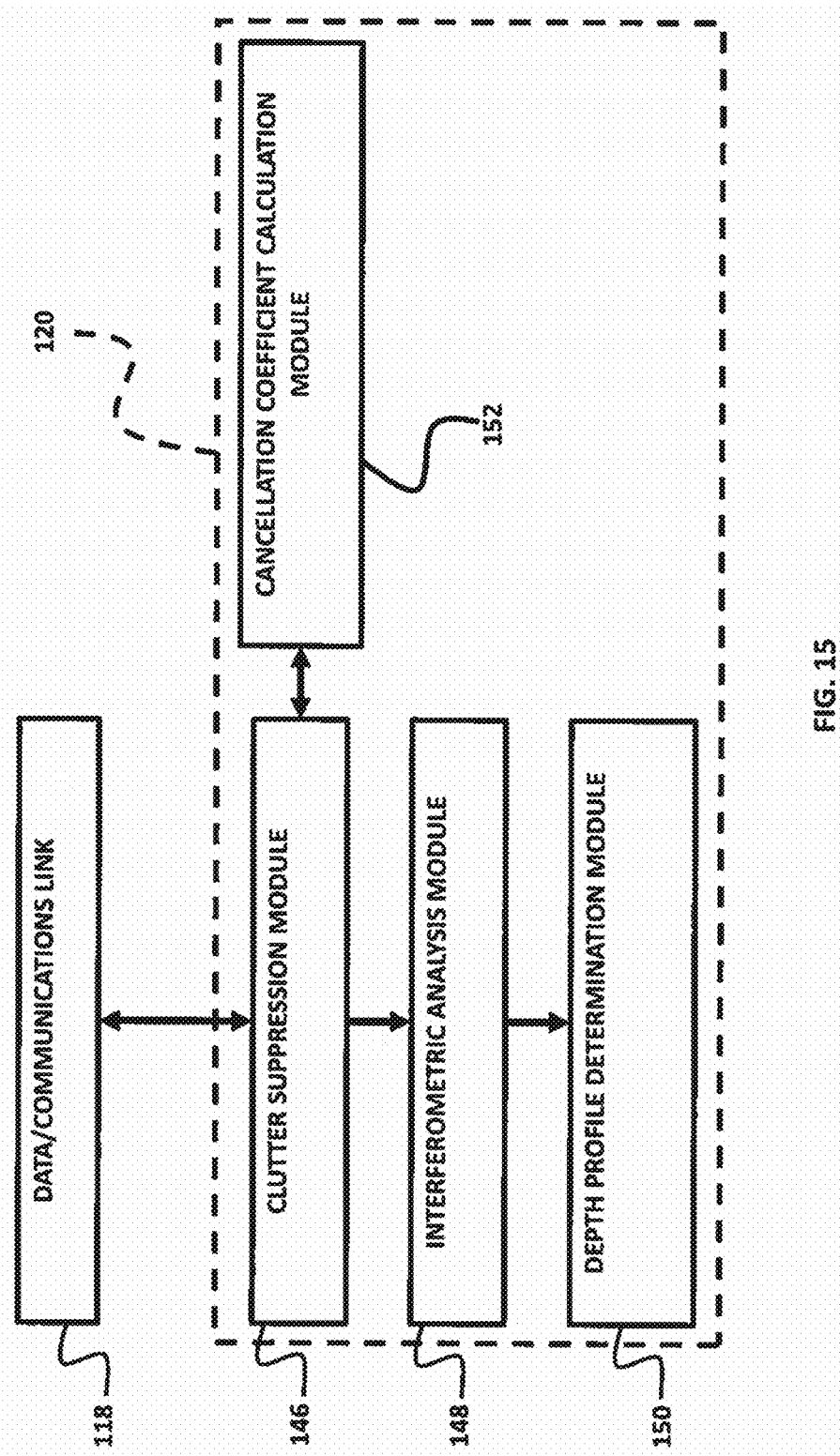
FIG. 15 is a functional block diagram illustrating an embodiment of the system for determining the location of a subsurface target including the depth of the subsurface target below the surface.

The transceivers 109, 110 communicate with the processing module 120 via a data/communications link 144. The transceivers 109 and 110 each include a transmitter 112, a receiver 114, 116, and circulator or duplexer 128, 130. The transceiver 109 includes a first polarized antenna 122, which is, for example, horizontally polarized for imaging the scene 103 with radio waves 108 of the first (e.g. horizontal) polarity. The transceiver 110 includes a second polarized antenna 124, which is, for example, vertically polarized for imaging the scene 103 with radio waves 108 of the second (e.g. vertical) polarity. The transceivers 109 and 110 share a common transmitter 112. This arrangement is made possible by the automatically operable switch 126, which in effect allows simultaneous imaging of the scene 103 with radio waves of the first and second polarity. The switch 126 allows the transmitter 112 to switch between operating the transceiver 109 and antenna 122 and operating the transceiver 110 and antenna 124. The components of the radar in FIG. 13 are well known and are therefore not discussed in detail.

The processing module 120 may be configured to include a clutter suppression module 146, an interferometric analysis module 148, and a depth profile determination module 150.

The clutter suppression module 146 may be configured to perform surface clutter suppression on a SAR imaging response by applying a polarimetric difference operation to the SAR imaging response to obtain a clutter-suppressed image. The interferometric analysis module 148 may be configured to calculate the interferometric phase based on a first clutter-suppressed image and a second clutter-suppressed image to generate interferometric data. The interferometric analysis module 148 may also be configured to obtain the first clutter-suppressed image and the second clutter-suppressed image from the clutter suppression module 146. The first clutter-suppressed image may be of a scene 103 including at least a portion of the target area 101, the scene extending, over at least a portion of the target 105, obtained along a first path 106, and the second clutter-suppressed image may be of the same scene 103 obtained along a second path 107.

The depth profile determination module 150 may be configured to calculate the depth of a detectable target-associated scattering feature at least for each record in the interferometric data corresponding to a pixel of an image of the scene within or including the target area based on the interferometric data, where the pixel has associated with it an indication of a corresponding detectable target-associated scattering feature.

The processing module may further comprise a cancellation coefficient calculation module 152. The cancellation coefficient calculation module 152 may be configured to receive a hh-polarized scene image $I_{hh}(\vec{r})$ of a training area scene including at least a portion of the training area obtained using radio waves of the first polarity, and the cancellation coefficient calculation module 152 may be configured to receive a vv polarized scene image $I_{vv}(\vec{r})$ of the training area scene obtained using radio waves of the second polarity. Also, the cancellation coefficient calculation module may be configured to derive a cancellation coefficient $\gamma_{min}(\theta_{inc})$ from the images $I_{hh}(\vec{r})$ and $I_{vv}(\vec{r})$ of the training area scene.

In some embodiments, the processing module 120 may be configured to control the clutter suppression module 146 to calculate a first clutter-suppressed image $I_1^{cs}(\vec{r})$ for the first path 106 by using the relation $I_1^{cs}=I_{hh,1}(\vec{r})-\gamma_{min}(\theta_{min})I_{vv,1}(\vec{r})$, and a second clutter-suppressed image $(I_2^{cs}(\vec{r}))$ for the second path 107 by using the relation $I_2^{cs}(\vec{r})= I_{hh,2}(\vec{r})-\gamma_{min}(\theta_{inc})I_{vv,2}(\vec{r})$. In the relations above, $I_{hh,1}(\vec{r})$ is a first scene image of a scene including at least a portion of the target area, the scene extending over at least a portion of the target, obtained using radio waves of the first polarity along the first path, $I_{vv,1}(\vec{r})$ is a second scene image of the scene obtained using radio waves of the second polarity along the first path, $I_{hh,2}(\vec{r})$ is a third scene image of the scene obtained using radio waves of the first polarity along the second path, and $I_{vv,2}(\vec{r})$ is a fourth scene image of the scene obtained using radio waves of the second polarity along the second path.

The interferometric analysis module 148 may be configured to calculate the interferometric phase using $\Delta\phi(I_1^{cs}(\vec{r}), I_2^{cs}(\vec{r}))=2k_c(-r_{eff,1}^c+|\vec{r}_1^c-\vec{r}|+r_{eff,2}^c-|\vec{r}_2^c-\vec{r}|)$. The depth profile determination module 150 may be configured to calculate the depth (d) of the detectable target-associated scattering feature at least for each record of the interferometric data corresponding to a pixel of an image of the scene within or including the target area, where the pixel has associated therewith an indication of a corresponding detectable target-associated scattering feature, by using $$\Delta\phi(I_1^{cs}(\vec{r}), I_2^{cs}(\vec{r})) = \Delta\phi^t - \Delta\phi_o^t,$$

$$\Delta\phi^t = 2k_cB\,\sin\left(\alpha - \cos^{-1}\left(\frac{H_1}{H_o}\right)\right) + 2d\mathrm{Re}[\Delta k_{gz}], \text{ and}$$

$$\Delta\phi_o^t = 2k_cB\,\sin\left(\alpha - \cos^{-1}\left(\frac{H_1}{r_{eff,1}}\right)\right).$$

The cancellation coefficient calculation module 152 may be configured to derive the cancellation coefficient $$\gamma_{min}(\theta_{inc}) \text{ using } \gamma_{min}(\theta_{inc}) = \arg\left[\min_{\gamma(\theta_{inc})}\left(\int_S |I_{hh}(\vec{r}) - \gamma(\theta_{inc})I_{vv}(\vec{r})|^2 dS\right)\right].$$

The processing module 120 may also be configured to correct the position of each of the detectable target-associated scattering features to account for the refraction of radio waves used in the SAR imaging by the subsurface medium. The various modifies recited herein may be implemented through software and/or hardware.

In some embodiments of the system herein, the first polarity is horizontal polarity and the second polarity is vertical polarity. In some embodiments of the system herein, the output means may comprise a display 140 and the processing module 120 may be configured to display a map, as shown in FIG. 4G, of the scene 103 within or including the target area 101 showing the apparent or actual positions of the detectable target-associated scattering features and showing the depth of each of the detectable target-associated scattering features by color coding the corresponding pixel.

In the illustrated embodiment, the mobile platform 100 is a helicopter. The radar apparatus of FIG. 13 would be carried on board the helicopter 100. The helicopter 100 makes two passes along parallel but spaced apart paths 106 and 107 to generate the two clutter-suppressed images used in the interferometric determination of depth. The processing module may also be on board the aircraft 100, or the processing module 120 may, be located at a ground station and communicate with the radar apparatus via a wireless or satellite link. Furthermore, other types of aircraft, drones, spacecraft/satellites, or ground vehicles may be used for the same purpose; however, airborne and space-borne platform are preferred. Also, two radar sets as illustrated in FIG. 13 may be carried by the mobile platform at spaced-apart locations on or attached to the mobile platform, which would allow the two paths to be covered in a single pass.

Within this application there are several patents and publications that are referenced, including the publications appearing under the heading "References" below. The disclosures of all these patents and publications, in their entireties, are hereby expressly incorporated by reference into the present application. In addition, the paper "Clutter-Suppressed, Subsurface Interferometric SAR Imaging of Target Under Slightly Rough Surface," by Liao, D., et al., Conference presentation/paper at 2018 IEEE Antennas and Propagation Symposium (July 2018), is incorporated by reference herein in its entirety.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

REFERENCES

[1] HELLSTEN, H et al., "Polarimetric subsurface SAR imaging: outcome of theoretical development and CARABAS III tests," 2014 *International Radar Conference*, Lille, 2014, pp. 1-8.
[2] LIAO, D., et al., "Large-scale, full-wave-based emulation of step-frequency forward-looking radar imaging in rough terrain environments," *Sensing and Imaging*, Vol, 15, pp. 1-29, April 2014.
[3] LIAO, et al, "Full-wave scattering and imaging characterization of realistic trees for FOPEN sensing," *IEEE Geoscience and Remote Sensing Letters*, vol. 13, no. 7, pp. 957-961, July 2016.
[4] LIAO, D., et al., "Near-earth wave propagation characteristics of electric dipole in presence of vegetation or snow layer," *IEEE Transactions on Antennas and Propagation*, vol. 53, no. 11, pp. 3747-3756, November 2005.
[5] LIAO, D., et al., "Full-wave characterization of rough terrain surface scattering for forward-looking radar applications," *IEEE Transactions on Antennas and Propagation*, vol. 60, no. 8, pp, 3853-3866, August 2012.
[6] LIAO, D., et al., "A comparison of surface integral equation and FDTD methods for modeling backscattering from dielectric rough surfaces at near-grazing angles," 2011 *IEEE International Symposium on Antennas and Propagation*, Spokane, Wash., 2011, pp. 232-235.
[7] DOGARU, T. et al., "SAR images of rooms and buildings based on FDTD computer models," *IEEE Transactions on Geoscience and Remote Sensing*, vol. 47, no, 5, pp. 1388-1401, May 2009.
[8] DOGARU, T. et al., "Recent investigations in sensing through the wall radar modeling," 2008 *IEEE Antennas and Propagation Society international Symposium*, San Diego, Calif., 2008, pp. 1-4.

What is claimed is:

1. A method for determining the location of a subsurface target including a depth of the subsurface target below a surface, the surface above the subsurface target comprising a target area that is above the subsurface target, the method comprising:
imaging a scene including at least a portion of the target area, the scene extending over at least a portion of the subsurface target, using synthetic aperture radar (SAR) imaging along a first path to obtain a first SAR imaging response;
performing surface clutter suppression on the first SAR imaging response by applying a polarimetric difference operation to the first SAR imaging response to obtain a first clutter-suppressed image;
imaging the scene using SAR imaging along a second path to obtain a second SAR imaging response;
performing surface clutter suppression on the second SAR imaging response by applying the polarimetric difference operation to the second SAR imaging response to obtain a second clutter-suppressed image; and
applying a subsurface interferometric algorithm to infer the depth of the target below the surface by correlating the first and second clutter-suppressed images obtained along the first and second paths.

2. The method of claim 1, wherein each of the first SAR imaging response and the second SAR imaging response comprises a corresponding target-scattered signal having a propagation phase and wherein the polarimetric difference operation does not alter the propagation phase of the target-scattered signal.

3. The method of claim 1, wherein the step of imaging the scene using SAR imaging along a first path comprises imaging the area using radio waves of a first polarity and imaging the area using radio waves of a second polarity.

4. The method of claim 3, wherein the step of imaging the scene using SAR imaging along a second path comprises imaging the area using radio waves of the first polarity and imaging the area using radio waves of the second polarity.

5. The method of claim 4, wherein the first polarity is horizontal polarity and the second polarity is vertical polarity.

6. The method of claim 5, wherein the surface has a roughness, wherein there is a subsurface medium below the surface and below the target area and the target is located within the subsurface medium, the method further comprising the steps of:
imaging a training area scene including at least a portion of a training area using radio waves of the first polarity to obtain an hh-polarized (horizontally polarized) scene image $I_{hh}(\vec{r})$;
imaging the training area scene using radio waves of the second polarity to obtain a vv-polarized (vertically polarized) scene image $I_{vv}(\vec{r})$,
wherein the training area has similar roughness and subsurface material properties to the target area and wherein the training area is devoid of targets at least to depths that are capable of being imaged by the method; and
deriving a cancellation coefficient $\gamma_{min}(\theta_{inc})$ from the images $I_{hh}(\vec{r})$ and $I_{vv}(\vec{r})$ for the training area scene.

7. The method of claim 6, wherein the step of performing surface clutter suppression on the first SAR imaging response comprises calculating a first clutter-suppressed image ($I_1^{cs}(\vec{r})$) for the first path by using the relation $$I_1^{cs}(\vec{r}) = I_{hh,1}(\vec{r}) - \gamma_{min}(\theta_{inc}) I_{vv,1}(\vec{r}), \text{ and}$$

wherein the step of performing surface clutter suppression on the second SAR imaging response comprises calculating a second clutter-suppressed image ($I_2^{cs}(\vec{r})$) for the second path by using the relation $$I_2^{cs}(\vec{r}) = I_{hh,2}(\vec{r}) - \gamma_{min}(\theta_{inc}) I_{vv,2}(\vec{r}),$$

wherein $I_{hh,1}(\vec{r})$ is a first scene image of the scene obtained using radio waves of the first polarity along the first path, wherein $I_{vv,1}(\vec{r})$ is a second scene image of the scene obtained using radio waves of the second polarity along the first path, wherein $I_{hh,2}(\vec{r})$ is a third scene image of the scene obtained using radio waves of the first polarity along the second path, and wherein $I_{vv,2}(\vec{r})$ is a fourth scene image of the scene obtained using radio waves of the second polarity along the second path.

8. The method of claim 1, wherein there is a subsurface medium below the surface and below the target area and the target is located within the subsurface medium, the method further comprising the step of correcting the position of the detectable target-associated scattering feature to account for the refraction of radio waves used in the SAR imaging by the subsurface medium.

9. A system for determining the location of a subsurface target including a depth of the subsurface target below a surface, the surface above the subsurface target comprising a target area that is above the subsurface target, the system comprising:
one or more radar transceivers installed on one or more mobile platforms, the one or more transceivers being configured to image a scene including at least a portion of the target area, the scene extending over at least a portion of the subsurface target, with radio waves of a first polarity and the one or more transceivers being configured to image the scene with radio waves of a second polarity;
a processing module configured to receive imagine data from the one or more transceivers, the processing module being programmable and comprising a processor, memory, data storage means, input means, and output means, the processing module being configured to include a clutter suppression module, an interferometric analysis module, and a depth profile determination module,
wherein the clutter suppression module is configured to perform surface clutter suppression on a SAR imaging response by applying a polarimetric difference operation to the SAR imaging response to obtain a clutter-suppressed image,
wherein the interferometric analysis module is configured to calculate the interferometric phase based on a first clutter-suppressed image and a second clutter-suppressed image to generate interferometric data, wherein the interferometric analysis module is configured to obtain the first clutter-suppressed image and the second clutter-suppressed image from the clutter suppression module, wherein the first clutter-suppressed image is of the scene obtained along a first path, and wherein the second clutter-suppressed image is of the scene obtained along a second path, and
wherein the depth profile determination module is configured to calculate the depth of a detectable target-associated scattering feature at least for each record in the interferometric data corresponding to a pixel of an image of the scene based on the interferometric data, wherein the pixel has associated therewith an indication of a corresponding detectable target-associated scattering feature.

10. The system of claim 9, wherein the surface has a roughness, wherein there is a subsurface medium below the surface and below the target area and the target is located within the subsurface medium, wherein the training area has similar roughness and subsurface material properties to the target area and wherein the training area is devoid of targets at least to depths that are capable of being imaged by the system, wherein the processing module further comprises a cancellation coefficient calculation module, the cancellation coefficient calculation module being configured to receive a hh-polarized scene image $I_{hh}(\vec{r})$ of a training area scene including at least a portion of the training area obtained using radio waves of the first polarity, the cancellation coefficient calculation module being configured to receive a vv-polarized scene image $I_{vv}(\vec{r})$ of the training area scene obtained using radio waves of the second polarity, and wherein the cancellation coefficient calculation module is configured to derive a cancellation coefficient $\gamma_{min}(\theta_{inc})$ from the images $I_{hh}(\vec{r})$ and $I_{vv}(\vec{r})$ of the training area scene.

11. The system of claim 10, wherein the processing module is configured to control the clutter suppression module to calculate a first clutter-suppressed image ($I_1^{cs}(\vec{r})$) for the first path by using the relation $$I_1^{cs}(\vec{r}) = I_{hh,1}(\vec{r}) - \gamma_{min}(\theta_{inc}) I_{vv,1}(\vec{r}), \text{ and}$$

wherein the processing module is configured to control the clutter suppression module to calculate a second clutter-suppressed image ($I_2^{cs}(\vec{r})$) MO for the second path by using the relation $$I_2^{cs}(\vec{r}) = I_{hh,2}(\vec{r}) - \gamma_{min}(\theta_{inc}) I_{vv,2}(\vec{r}),$$

wherein $I_{hh,1}(\vec{r})$ is a first scene image of the scene including at least a portion of the target area obtained using radio waves of the first polarity along the first path, wherein $I_{vv,1}(\vec{r})$ is a second scene image of the scene obtained using radio waves of the second polarity along the first path, wherein $I_{hh,2}(\vec{r})$ is a third scene image of the scene obtained using radio waves of the first polarity along the second path, and wherein $I_{vv,2}(\vec{r})$ is a fourth scene image of the scene obtained using radio waves of the second polarity along the second path.

12. The system of claim 9, wherein there is a subsurface medium below the surface and below the target area and the target is located within the subsurface medium and wherein the processing module is configured to correct the position of each detectable target-associated scattering feature to account for the refraction of radio waves used in the SAR imaging by the subsurface medium.

13. The system of claim 9, wherein the first polarity is horizontal polarity and the second polarity is vertical polarity.

* * * * *